United States Patent
Ueno et al.

(10) Patent No.: US 9,455,652 B2
(45) Date of Patent: Sep. 27, 2016

(54) MOTOR DRIVE

(71) Applicants: Tomohiro Ueno, Tokyo (JP); Yoshitaka Onishi, Tokyo (JP); Satoshi Kawamura, Tokyo (JP); Shinsuke Takeshima, Kobe (JP)

(72) Inventors: Tomohiro Ueno, Tokyo (JP); Yoshitaka Onishi, Tokyo (JP); Satoshi Kawamura, Tokyo (JP); Shinsuke Takeshima, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/441,134

(22) PCT Filed: Jan. 31, 2013

(86) PCT No.: PCT/JP2013/052213
§ 371 (c)(1),
(2) Date: May 6, 2015

(87) PCT Pub. No.: WO2014/118942
PCT Pub. Date: Aug. 7, 2014

(65) Prior Publication Data
US 2015/0303839 A1   Oct. 22, 2015

(51) Int. Cl.
*H02P 6/00* (2016.01)
*H02P 6/24* (2006.01)
*H02P 27/08* (2006.01)
*H02P 29/02* (2016.01)
*H02H 7/08* (2006.01)

(52) U.S. Cl.
CPC ............ *H02P 6/002* (2013.01); *H02H 7/0838* (2013.01); *H02P 6/24* (2013.01); *H02P 27/08* (2013.01); *H02P 29/027* (2013.01)

(58) Field of Classification Search
CPC .......... H02P 27/08; H02P 6/002; H02P 6/24; H02P 29/027; H02P 6/085; H02P 3/12; H02P 3/22; H02P 23/0004; H02P 29/0044; H02P 29/0088; H02P 6/00; H02P 6/08; H02P 6/14; H02P 6/15; H02P 6/153
USPC ................ 318/400.2, 400.3, 400.11, 400.22
See application file for complete search history.

(56) References Cited

U.S. PATENT DOCUMENTS

| | | | | |
|---|---|---|---|---|
| 5,319,291 A | * | 6/1994 | Ramirez | H02P 6/085 318/400.13 |
| 5,814,957 A | | 9/1998 | Yoshida | |
| 5,859,510 A | * | 1/1999 | Dolan | H02P 6/085 318/400.08 |
| 5,914,582 A | * | 6/1999 | Takamoto | B60L 3/0023 318/299 |
| 5,976,056 A | * | 11/1999 | Matsumoto | B60W 30/18 477/125 |

(Continued)

FOREIGN PATENT DOCUMENTS

| | | |
|---|---|---|
| JP | 2-303387 A | 12/1990 |
| JP | 9-219990 A | 8/1997 |

(Continued)

*Primary Examiner* — Paul Ip
(74) *Attorney, Agent, or Firm* — Birch, Stewart, Kolasch & Birch, LLP

(57) ABSTRACT

If a bus current a bus current detector 11 detects exceeds a current cutoff value, an overcurrent detector 12 supplies a gate driver 14 with an open signal for turning off switching elements 5-10 to break the current to a motor 1. Besides, when the overcurrent detector 12 detects an overcurrent, a feedback controller 15 provides the gate driver 14 with a short-circuit braking instruction to apply short-circuit braking after breaking the power supply, and to restart PWM control from a state in which the short-circuit braking is being applied and the duty ratio command value is reset at 0.

6 Claims, 17 Drawing Sheets

(56) References Cited

U.S. PATENT DOCUMENTS

| | | | | |
|---|---|---|---|---|
| 6,047,679 | A * | 4/2000 | Matsumoto | F02D 11/107 123/396 |
| 7,023,152 | B2 * | 4/2006 | Sunaga | H02P 3/12 318/34 |
| 8,766,566 | B2 * | 7/2014 | Baba | H02J 7/0054 318/139 |
| 2004/0189225 | A1 * | 9/2004 | Sunaga | H02P 3/12 318/280 |
| 2008/0199160 | A1 * | 8/2008 | Yamazaki | B62D 5/0469 388/815 |
| 2008/0231219 | A1 * | 9/2008 | Mori | H02P 3/22 318/434 |
| 2009/0284205 | A1 * | 11/2009 | Yamamoto | B60R 21/017 318/490 |
| 2010/0253266 | A1 | 10/2010 | Jeung | |
| 2012/0153877 | A1 * | 6/2012 | Baba | H02J 7/0054 318/139 |
| 2012/0199372 | A1 * | 8/2012 | Nishikawa | B25B 23/1475 173/132 |
| 2012/0279736 | A1 * | 11/2012 | Tanimoto | B25B 21/02 173/2 |
| 2013/0082627 | A1 * | 4/2013 | Ichikawa | H02P 6/00 318/139 |
| 2013/0314007 | A1 * | 11/2013 | Yanagihara | H02P 6/002 318/139 |
| 2014/0092655 | A1 * | 4/2014 | Igarashi | B60L 3/003 363/56.03 |
| 2014/0210379 | A1 * | 7/2014 | Kato | H02P 6/15 318/139 |
| 2015/0303839 | A1 * | 10/2015 | Ueno | H02P 27/08 318/400.22 |
| 2015/0326151 | A1 * | 11/2015 | Ogawa | H02P 3/22 318/703 |

FOREIGN PATENT DOCUMENTS

| | | |
|---|---|---|
| JP | 10-271884 A | 10/1998 |
| JP | 2006-211831 A | 8/2006 |
| JP | 2006-230119 A | 8/2006 |
| JP | 3926369 B2 | 6/2007 |
| JP | 2008-105652 A | 5/2008 |
| JP | 2008-236983 A | 10/2008 |
| JP | 2010-246369 A | 10/2010 |
| JP | 4605371 B2 | 1/2011 |
| WO | WO 2012/077187 A1 | 6/2012 |

* cited by examiner

FIG.9
(a)
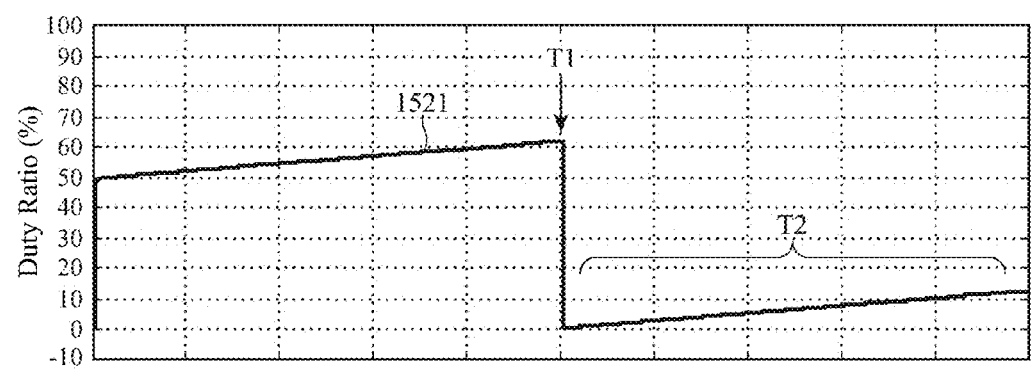
(b)
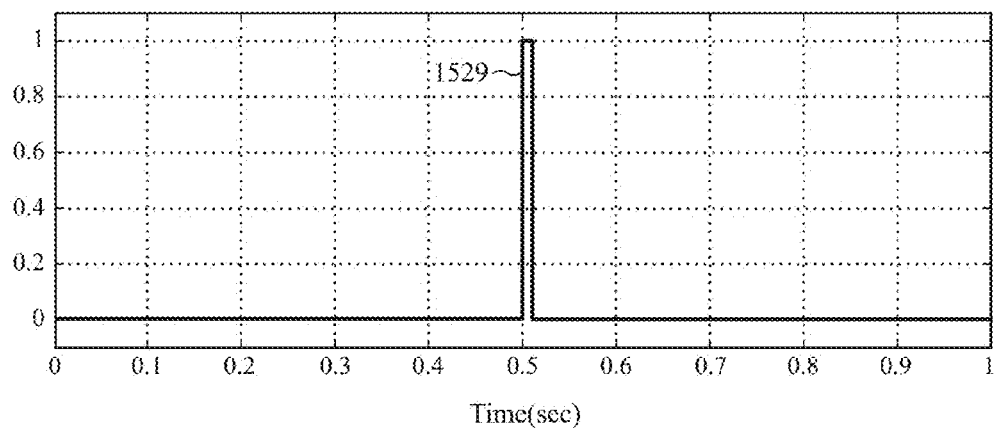

MOTOR DRIVE

TECHNICAL FIELD

The present invention relates to a motor drive with an overcurrent protective system that detects an overcurrent through a bus.

BACKGROUND ART

As for a motor drive that drives and controls a motor such as a brushless motor, if it detects an abnormal current, it generally stops power supply to the motor to protect the circuit. On the other hand, at the rotor reversal of the motor or when the motor is rotated in the direction opposite to the driving direction by an external load, a large current flows through a motor with low resistance. Thus, if the motor drive detects the large current as an abnormal current and stops power supply, the rotor is placed in an idle running state in which it rotates freely, and its reversal is delayed. Accordingly, a motor drive with a vector control system carries out current feedback based on phase currents, and appropriately controls regenerative currents at the reversal.

On the other hand, a motor drive without the current feedback requires such control as suppressing an overcurrent at the reversal. As prior art for such a purpose, Patent Documents 1-4 are known, for example.

The Patent Document 1 relates to a technique that protects from an overcurrent using a microprocessor. It devises an abnormal countermeasure if a result of subtracting the product of a motor rotational speed detection value and a counter electromotive force coefficient from a motor applied voltage command value exceeds the product of a prescribed overcurrent value and an armature resistance.

In addition, the Patent Document 2 limits a voltage command value for driving a motor if the motor driving current exceeds a prescribed value.

Furthermore, the Patent Document 3, which controls the voltage command value through the feedback of the motor rotational speed, limits the voltage command value in such a manner that it operates at a value lower than a motor induced voltage estimated from the rotational speed, that it produces necessary torque, and that it does not bring about an overcurrent.

In addition, the Patent Document 4 limits the voltage command value by using as a limit voltage the sum of an induced voltage estimation value, which consists of the product of a speed command that causes a motor to make a soft start and an induced voltage constant, and an impedance voltage drop estimation value, which consists of the product of the motor impedance and the maximum current command.

PRIOR ART DOCUMENT

Patent Document

Patent Document 1: Japanese Patent Laid-Open No. 2-303387.
Patent Document 2: Japanese Patent Laid-Open No. 2008-105652.
Patent Document 3: Japanese Patent Laid-Open No. 2006-211831.
Patent Document 4: Japanese Patent Laid-Open No. 2006-230119.

DISCLOSURE OF THE INVENTION

Problems to be Solved by the Invention

The conventional motor drives are all configured in such a manner as to suppress the overcurrent by limiting the voltage command value without considering the current flowing through the bus. Accordingly, as for a system that detects an overcurrent from the peak value of the bus current, it detects as an overcurrent a large current that flows when the driving direction and the rotor rotational direction are reversed, thereby offering a problem of detecting an anomaly even if it is normal.

The present invention is implemented to solve the foregoing problems. Therefore it is an object of the present invention to provide a motor drive with an overcurrent protective system, which detects an overcurrent through a bus, and is capable of controlling an abnormal detection situation even if it is normal.

Means for Solving the Problems

A motor drive in accordance with the present invention comprises: an overcurrent detector that detects an overcurrent by comparing a bus current flowing through a bus with a current cutoff threshold; a feedback controller that calculates a duty ratio command value in a manner as to follow a reference value with a method like PID control; and a gate driver that supplies power to the motor by controlling duty ratios of the switching elements in accordance with the duty ratio command value the feedback controller calculates, and that breaks, if the overcurrent detector detects the overcurrent, the power by opening the switching elements, wherein the feedback controller provides, if the overcurrent detector detects the overcurrent, the gate driver with a short-circuit braking instruction for short-circuiting the motor to apply a short-circuit brake after the gate driver breaks the power to the motor, and restarts PWM control from the short-circuit braking state and from a state in which the duty ratio command value calculated by the feedback controller is reset to zero or to a value that will prevent the overcurrent.

Here, the term "duty ratio" refers to a ratio of the duration of supplying power to a motor, or of the duration in which the switching elements are in continuity.

Advantages of the Invention

According to the present invention, at the overcurrent detection, it applies the short-circuit brake and resets the duty ratio command value of the feedback control to zero or to the value that will prevent the overcurrent, thereby causing the duty ratio to increase gradually in the feedback control including integral control like PID. Accordingly, at a restart of the PWM control, it can suppress the bus current, making it harder to detect the overcurrent. As a result, it can control abnormal detection during the normal operation such as at a reversal of the motor with a small resistance value. In addition, since it can reduce the power cutoff at abnormal detection, it can suppress idle running due to the power cutoff, thereby being able to increase its responsiveness.

BRIEF DESCRIPTION OF THE DRAWINGS

FIG. 9 is a graph showing a variation of a duty ratio command value when varying a reset duty ratio set point from 0 to 1 in a state in which the feedback controller of FIG. 8 is carrying out normal feedback control;

BEST MODE FOR CARRYING OUT THE INVENTION

The best mode for carrying out the invention will now be described with reference to the accompanying drawings to explain the present invention in more detail.

Embodiment 1

Figure 1:
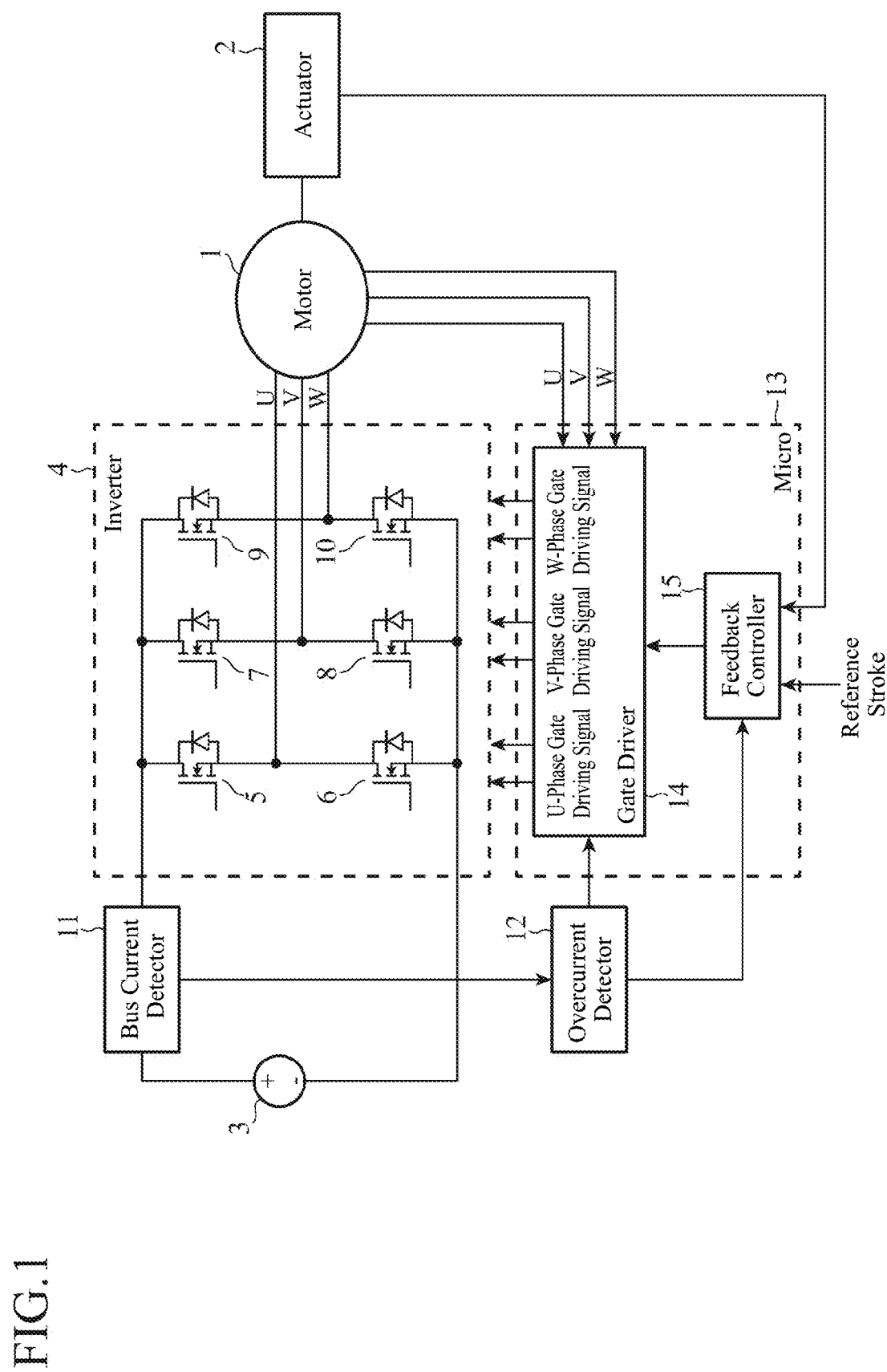
FIG. 1 is a circuit diagram showing a configuration of a motor drive of an embodiment 1 in accordance with the present invention.

As shown in FIG. 1, a motor drive of the present embodiment 1 operates an actuator 2 by driving a motor (brushless motor) 1 with the AC output of a 3-phase inverter 4. A microcomputer (referred to as "micro" from now on) 13 controls the power supply from a DC power supply 3 to the motor 1 by controlling the gate driving signals of switching elements 5-10 constituting a 3-phase bridge, thereby controlling the motor 1 at a desired rotational state. Incidentally, although the switching elements 5-10 are denoted by a symbol of a MOS-FET, other switching elements such as an IGBT are also possible.

The magnitude of the bus current of the motor 1 is always observed with a bus current detector 11, and is supplied to an overcurrent detector 12. In FIG. 1, although the bus current detector 11 is configured to detect the positive side current of the DC power supply 3 as the bus current, it can be configured so as to detect the negative side GND current. The overcurrent detector 12 converts the bus current detection value to the absolute value, and if the bus current absolute value exceeds a preset current cutoff threshold, it supplies a gate driver 14 with an open signal for turning off all the switching elements 5-10. For example, if the overcurrent detector 12 detects the overcurrent exceeding the current cutoff value, a monostable multivibrator (not shown) supplies the gate driver 14 with the open signal for prescribed duration.

In addition, if the bus current absolute value exceeds the current cutoff threshold, to make the duty ratios zero of the gate driving signals of all the switching elements 5-10, the overcurrent detector 12 provides the micro 13 with a command to an open signal of FIG. 2 which will be described later, and with a short-circuit braking instruction for short-circuiting the motor 1 by turning off the high side switching elements 5, 7 and 9 of the U-phase, V-phase and W-phase, and by turning on the low side switching elements 6, 8 and 10 of the individual phases. Incidentally, in the present embodiment 1, a duty ratio=0 command also serves as the short-circuit braking instruction as described above.

Figure 2:
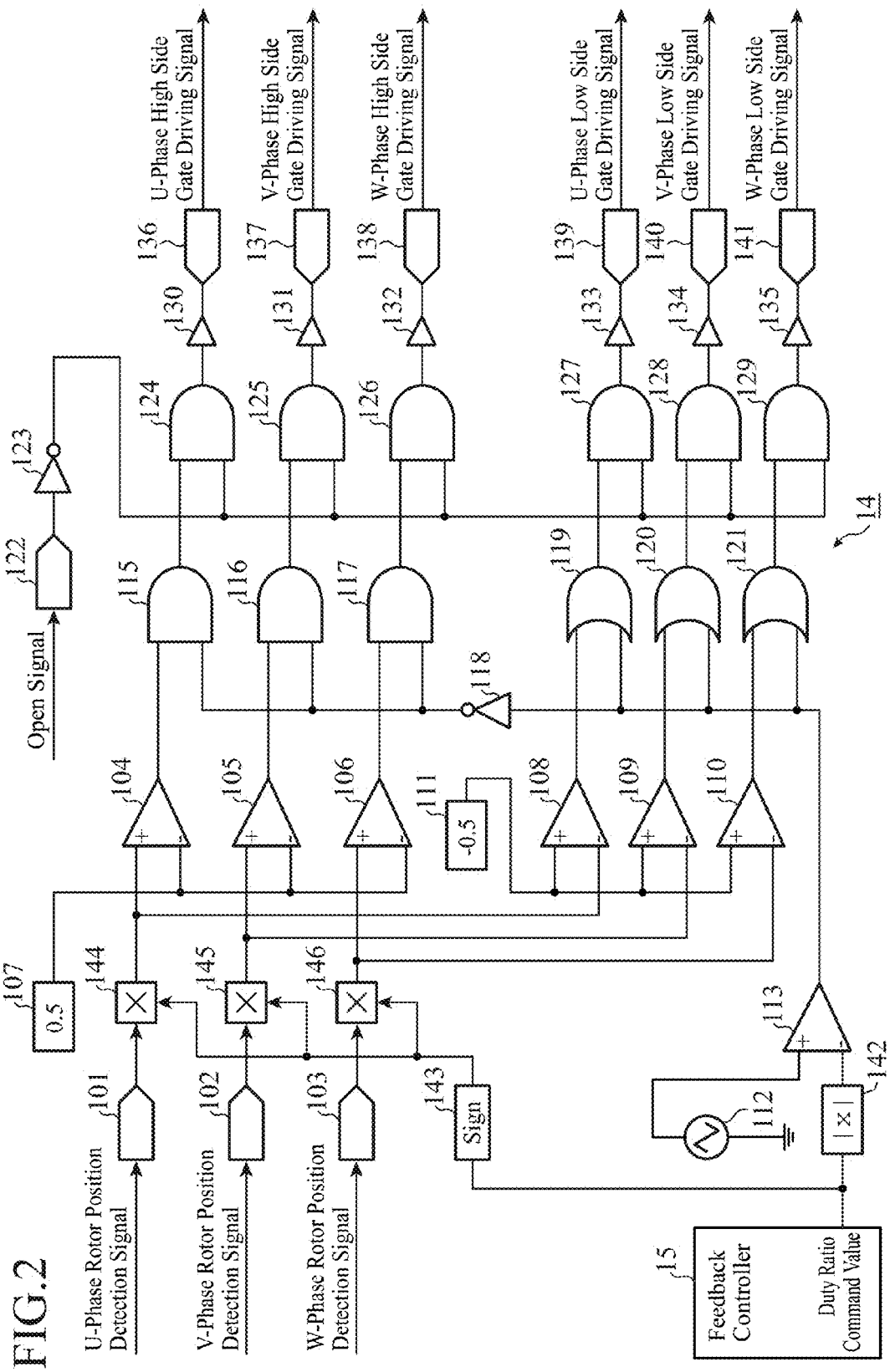
FIG. 2 is a circuit diagram illustrating the driving logic of switching elements by the gate driver of the motor drive of the embodiment 1.

FIG. 2 is a circuit diagram illustrating the driving logic of the switching elements 5-10 by the gate driver 14.

Figure 3:
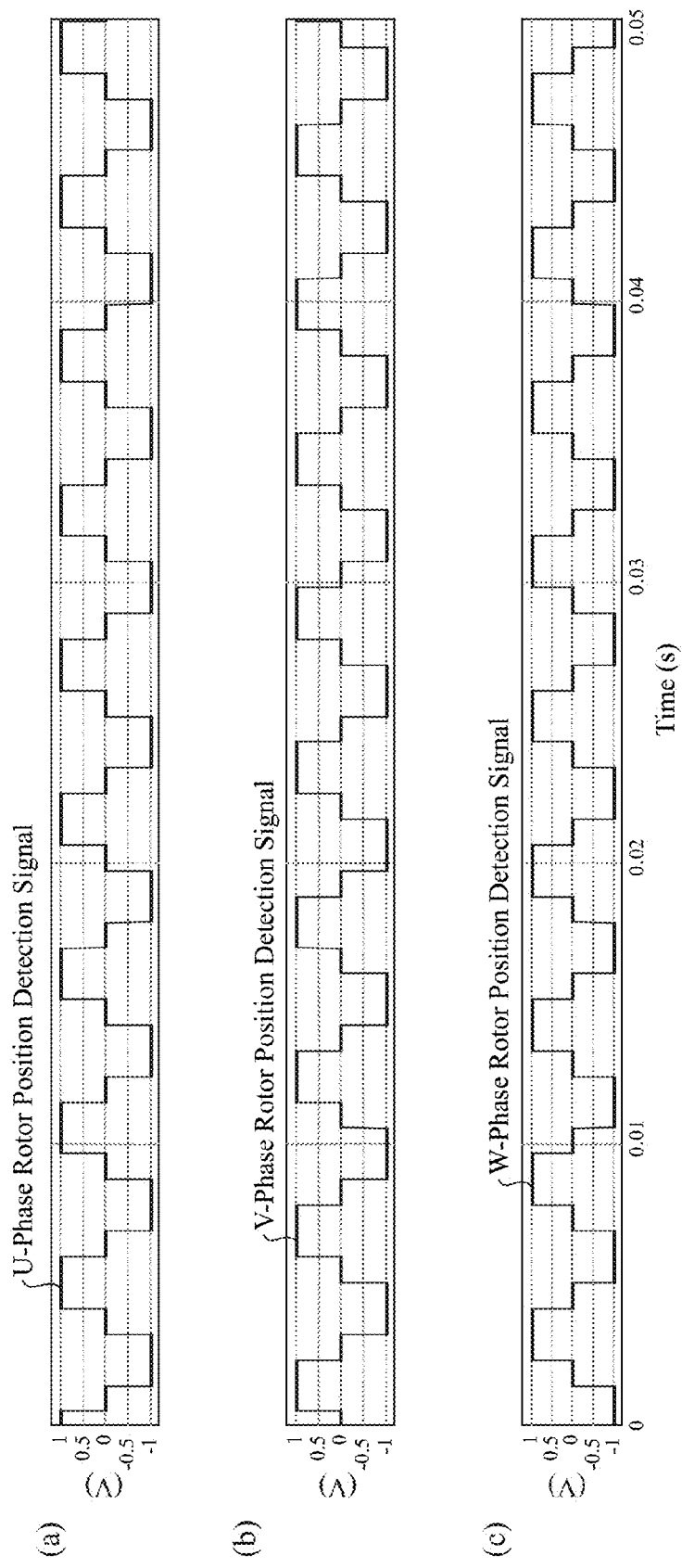
FIG. 3 is a graph showing 3-phase rotor position detection signals input to the motor drive of the embodiment 1.

Although not shown FIG. 2, the motor 1 comprises a Hall sensor for detecting the rotational position of the rotor, and the Hall sensor outputs 3-phase rotor position detection signals for making 120-degree conduction of the motor 1. The 3-phase rotor position detection signals are input to the gate driver 14 through a U-phase rotor position detection signal input port 101, a V-phase rotor position detection signal input port 102, and a W-phase rotor position detection signal input port 103. Here, FIG. 3(a) shows a waveform of the U-phase rotor position detection signal supplied to the U-phase rotor position detection signal input port 101; FIG. 3(b) shows a waveform of the V-phase rotor position detection signal supplied to the V-phase rotor position detection signal input port 102; and FIG. 3(c) shows a waveform of the W-phase rotor position detection signal supplied to the W-phase rotor position detection signal input port 103. In each graph, the vertical axis represents voltage and the horizontal axis represents time. The U-phase, V-phase, and W-phase rotor position detection signals have phases shifting by 120 degrees in terms of an electrical angle from each other.

As for the input 3-phase rotor position detection signals, to generate the gate driving signals of the high side switching elements 5, 7 and 9, comparators 104-106 compare them with a threshold (0.5, for example) set in a threshold setting unit 107, and their outputs become original signals prior to the duty ratio drive by the high side gate driving signals.

Likewise, to generate the gate driving signals of the low side switching elements 6, 8 and 10, comparators 108-110 compare the 3-phase rotor position detection signals with a threshold (−0.5, for example) set in the threshold setting unit 111, and their outputs become original signals prior to the duty ratio drive of the low side gate driving signals.

Figure 4:
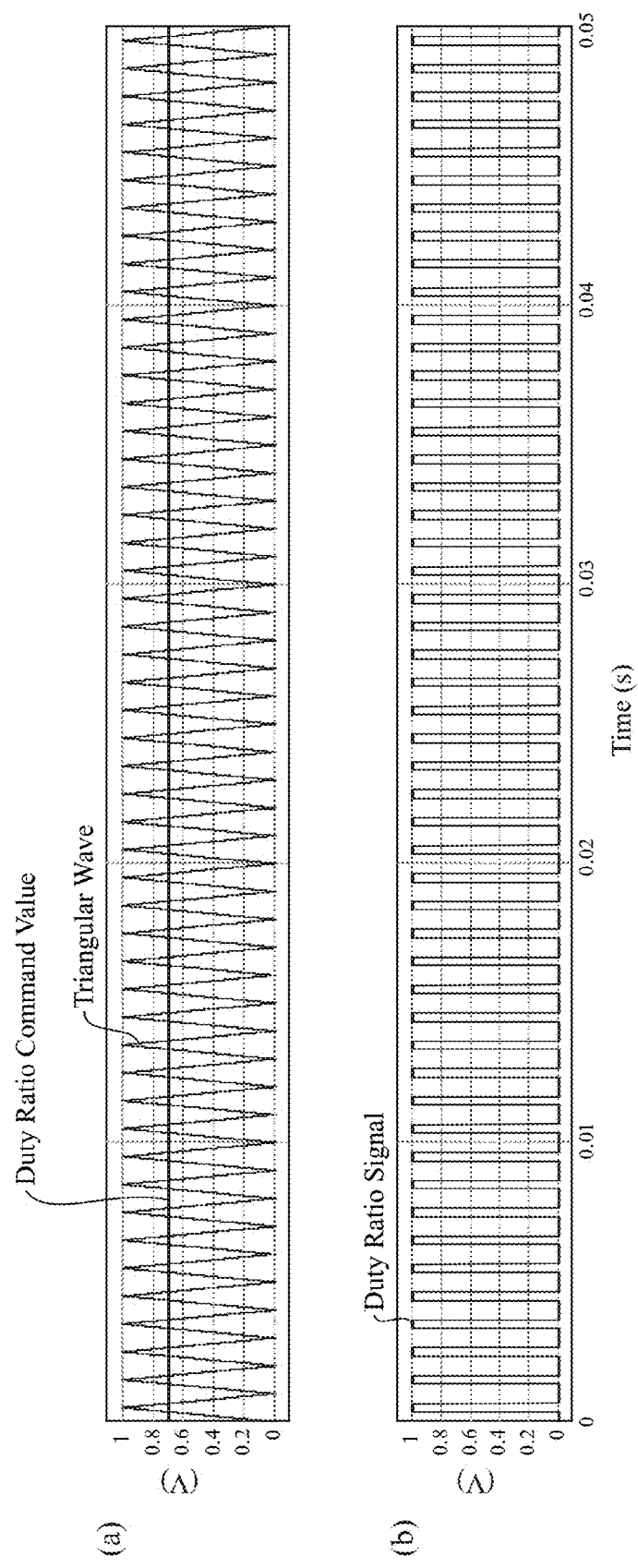
FIG. 4 is a graph showing a signal waveform the gate driver of the motor drive of the embodiment 1 generates.

The logic shown in FIG. 2 performs PWM control to regulate the magnitude of the current carried to the motor 1. The comparator 113 compares a triangular wave generated by a triangular wave oscillator 112 with the absolute value of the duty ratio command value output from the feedback controller 15 of the micro 13, thereby generating a duty ratio signal. The positive or negative duty ratio command value output from the feedback controller 15 is converted to the absolute value through an absolute value circuit 142. Here, FIG. 4(*a*) shows a waveform of the triangular wave and a waveform of the duty ratio command value supplied to the comparator 113; and FIG. 4(*b*) shows a waveform of the duty ratio signal output from the comparator 113. In each graph, the vertical axis represents voltage and horizontal axis represents time. The example shows the duty ratio signal when the duty ratio command value is 0.7.

A sign circuit 143 outputs 1 when the duty ratio command value output from the feedback controller 15 takes a positive value, and −1 when it is a negative value. Multipliers 144-146 multiply the rotor position detection signals by the value output from a sign circuit 143, thereby controlling the rotational direction of the motor 1. More specifically, when the duty ratio command value output from the feedback controller 15 takes a positive value, retaining the rotor position detection signals, the multipliers handles the gate driving signals of the switching elements 5-10 so as to drive the motor 1 forward. In contrast, when the duty ratio command value takes a negative value, inverting the rotor position detection signals, they reverse the currents carried to the motor 1. Thus, the motor 1 is driven in the reversal direction.

The duty ratio signal the comparator 113 outputs is supplied to first input terminals of AND gates 115-117 via an inverter 118. The AND gates 115-117 are used for generating gate driving signals of the high side switching elements 5, 7 and 9. In addition, the duty ratio signal the comparator 113 outputs is supplied to first input terminals of OR gates 119-121 for generating gate driving signals of the low side switching elements 6, 8 and 10. Thus, as long as the duty ratio signal of the comparator 113 is 1, the outputs of the AND gates 115-117 are 0, and the outputs of the OR gates 119-121 are 1.

The open signal the overcurrent detector 12 outputs is input to the gate driver 14 via an open signal input port 122, is inverted through an inverter 123, and is supplied to first input terminals of AND gates 124-129 for opening the switching elements 5-10. Second input terminals of the AND gates 124-129 are connected to the output terminals of the AND gates 115-117 and to the output terminals of the OR gates 119-121. As a result, when the open signal 1 is input to the open signal input port 122, the gate driving signals the AND gates 124-129 output become 0, thereby turning off the switching elements 5-10. In contrast, as long as 0 is input to the open signal input port 122, the gate driving signals based on the duty ratio command value of the feedback controller 15 are generated.

Figure 5:
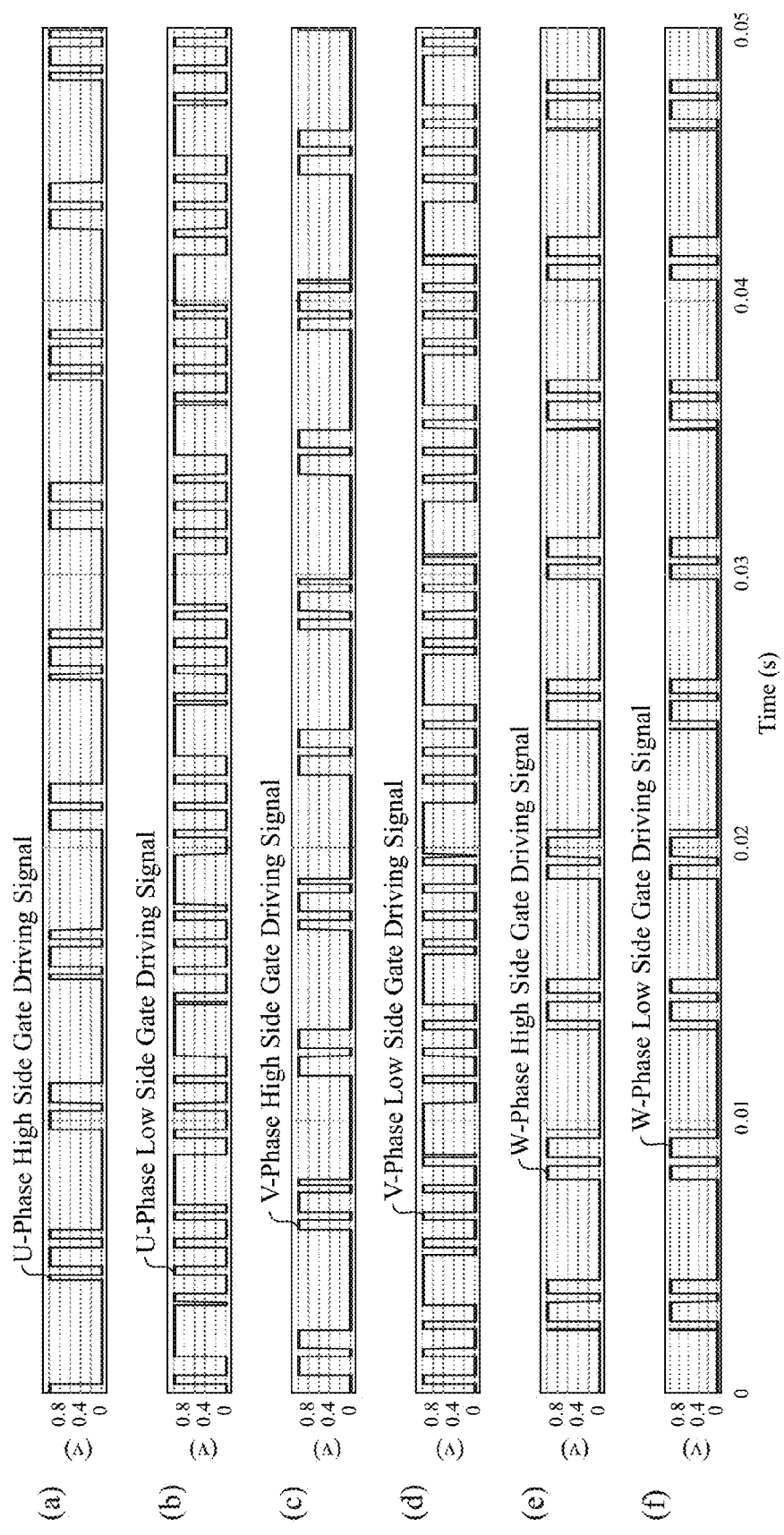
FIG. 5 is a graph showing 3-phase gate driving signals the gate driver of the motor drive of the embodiment 1 generates.

The gate driving signals of the switching elements 5-10 thus generated are output from gate driving signal output ports 136-141 after passing through signal generators 130-135, and are supplied to the switching elements 5-10. Here, FIG. 5(*a*) shows a waveform of the gate driving signal supplied from the gate driving signal output port 136 to the U-phase high side switching element 5; FIG. 5(*b*) shows a waveform of the gate driving signal supplied from the gate driving signal output port 139 to the U-phase low side switching element 6; FIG. 5(*c*) shows a waveform of the gate driving signal supplied from the gate driving signal output port 137 to the V-phase high side switching element 7; FIG. 5(*d*) shows a waveform of the gate driving signal supplied from the gate driving signal output port 140 to the V-phase low side switching element 8; FIG. 5(*e*) shows a waveform of the gate driving signal supplied from the gate driving signal output port 138 to the W-phase high side switching element 9; and FIG. 5(*f*) shows a waveform of the gate driving signal supplied from the gate driving signal output port 141 to the W-phase low side switching element 10. In each graph, the vertical axis represents voltage and the horizontal axis represents time.

On the other hand, when the duty ratio command value supplied from the feedback controller 15 to the comparator 113 is 0, the output of the comparator 113 is kept at a constant value 1. Accordingly, the gate driving signal output ports 136-138 output the gate driving signals that turn off all the high side switching elements 5, 7 and 9. On the other hand, the gate driving signal output ports 139-141 output the gate driving signals that turn on all the low side switching elements 6, 8 and 10. Thus, the motor 1 becomes a short-circuit braking state. In this way, in the present embodiment 1, the gate driver 14 carries out the logic control that operates the short-circuit braking while the duty ratio command=0.

Incidentally, the example of FIG. 2 has a logical configuration that carries out the short-circuit braking by controlling in such a manner that the high side switching elements 5, 7 and 9 are turned off and the low side switching elements 6, 8 and 10 are turned on. In contrast with this, a logical configuration is also possible which carries out the short-circuit braking by controlling in such a manner that the high side switching elements 5, 7 and 9 are turned on, and the low side switching elements 6, 8 and 10 are turned off.

In addition, as for the switching element driving logic of the gate driver 14 shown in FIG. 2, it can be achieved by logic control of the micro 13, or can be configured by hardware.

Next, the feedback controller 15 of the micro 13 will be described. The example of FIG. 1 supposes a case in which the motor 1 drives the actuator 2, and the real stroke of the actuator 2 undergoes feedback control (PID control, for example). The feedback controller 15 receives the real stroke and the reference stroke of the actuator 2. The reference stroke varies dynamically.

The feedback controller 15 calculates the duty ratio in a manner that the difference between the real stroke and the reference stroke becomes zero, and supplies it to the gate driver 14 as the duty ratio command value. In such a system, in conformity with the movements of the reference stroke, reversals of the motor 1 occur frequently. In particular, as for the motor 1 with a small resistance, a large current is apt to flow at the reversals. When the overcurrent detector 12 detects the large current during the feedback control, it outputs the duty ratio=0 command (which also serves as the short-circuit braking instruction) and the open signal.

Next, the operation of the motor drive of the present embodiment 1 will be described with reference to FIG. 6 and FIG. 7.

Figure 6:
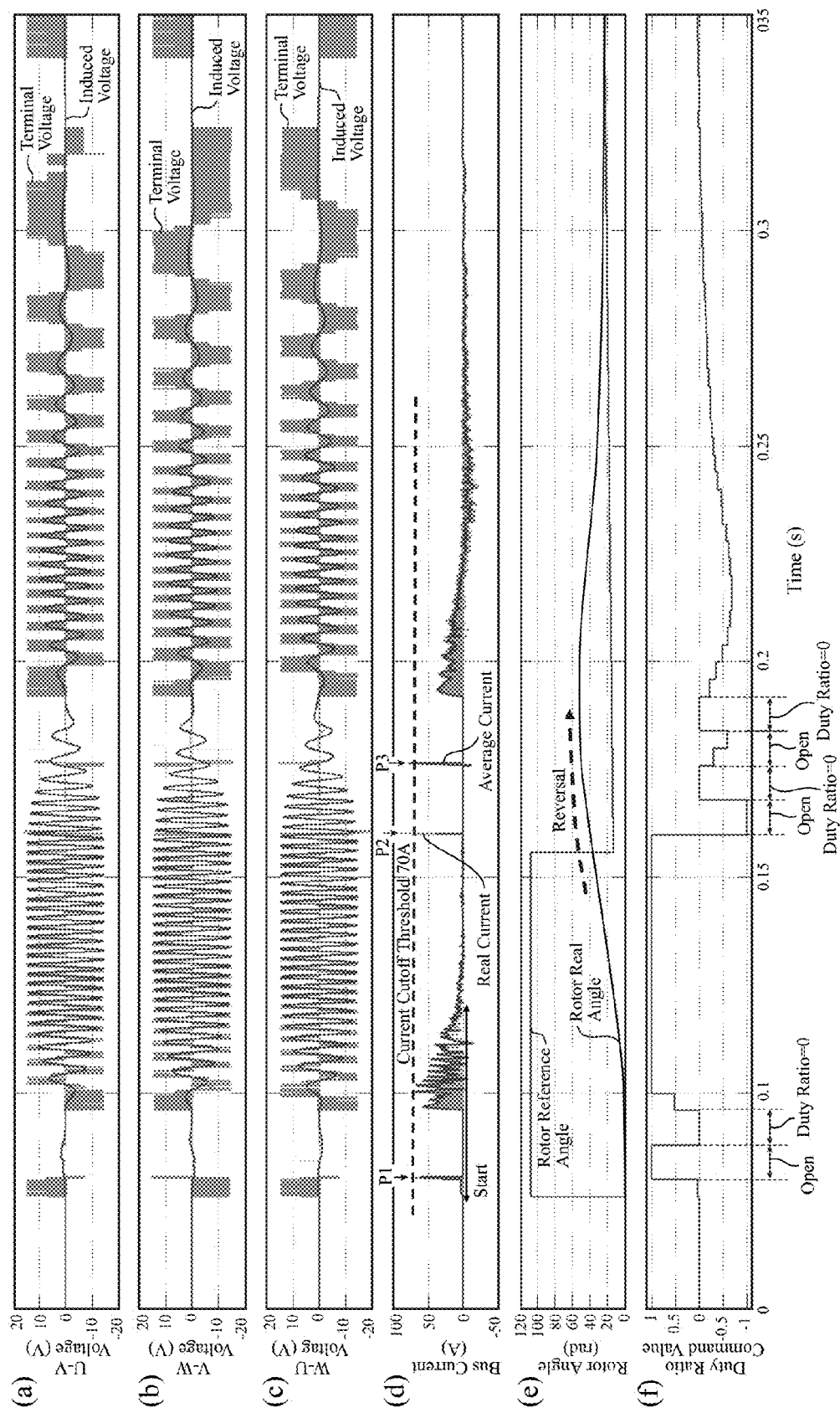
FIG. 6 is a graph showing operational waveforms of the motor drive of the embodiment 1.

FIG. 6(*a*) shows waveforms of U-V terminal voltage and induced voltage of the motor 1; FIG. 6(*b*) shows waveforms of V-W terminal voltage and induced voltage; and FIG. 6(*c*) shows waveforms of W-U terminal voltage and induced voltage. In each graph, the vertical axis represents voltage and the horizontal axis represents time. FIG. 6(*d*) shows waveforms of the real current and average current through the bus the bus current detector 11 detects, in which the vertical axis represents current and the horizontal axis represents time. FIG. 6(*e*) shows waveforms of the rotor reference angle (corresponding to the reference stroke) and the rotor real angle (corresponding to the real stroke of the actuator 2) of the motor 1, in which the vertical axis represents the angle and the horizontal axis represents time.

FIG. 6(f) shows a waveform of the duty ratio command value the feedback controller 15 of the micro 13 outputs, in which the vertical axis represents the duty ratio and the horizontal axis represents time. Incidentally, since the driving by the circuit as shown in FIG. 2 switches the switching elements 5-10 as described above, when the duty ratio>0, the driving is forward, and when the duty ratio<0, the driving is reverse.

In the example of FIG. 6, the overcurrent detector 12 detects an overcurrent at the current cutoff threshold 70 A, and if a peak current through the bus the bus current detector 11 detects exceeds 70 A (P1, P2, and P3), the overcurrent detector 12 supplies the open signal to the micro 13 for a prescribed time period to turn off all the switching elements 5-10, thereby breaking the power supply to the motor 1. This makes it possible to reduce the bus current without delay, and hence can prevent the breakdown of the circuit elements owing to the overcurrent.

In addition, if the peak current through the bus exceeds 70 A (P1, P2 and P3), the overcurrent detector 12 delivers the duty ratio=0 command to the micro 13 to reset the duty ratio command value to a set point and to apply the short-circuit braking.

Figure 7:
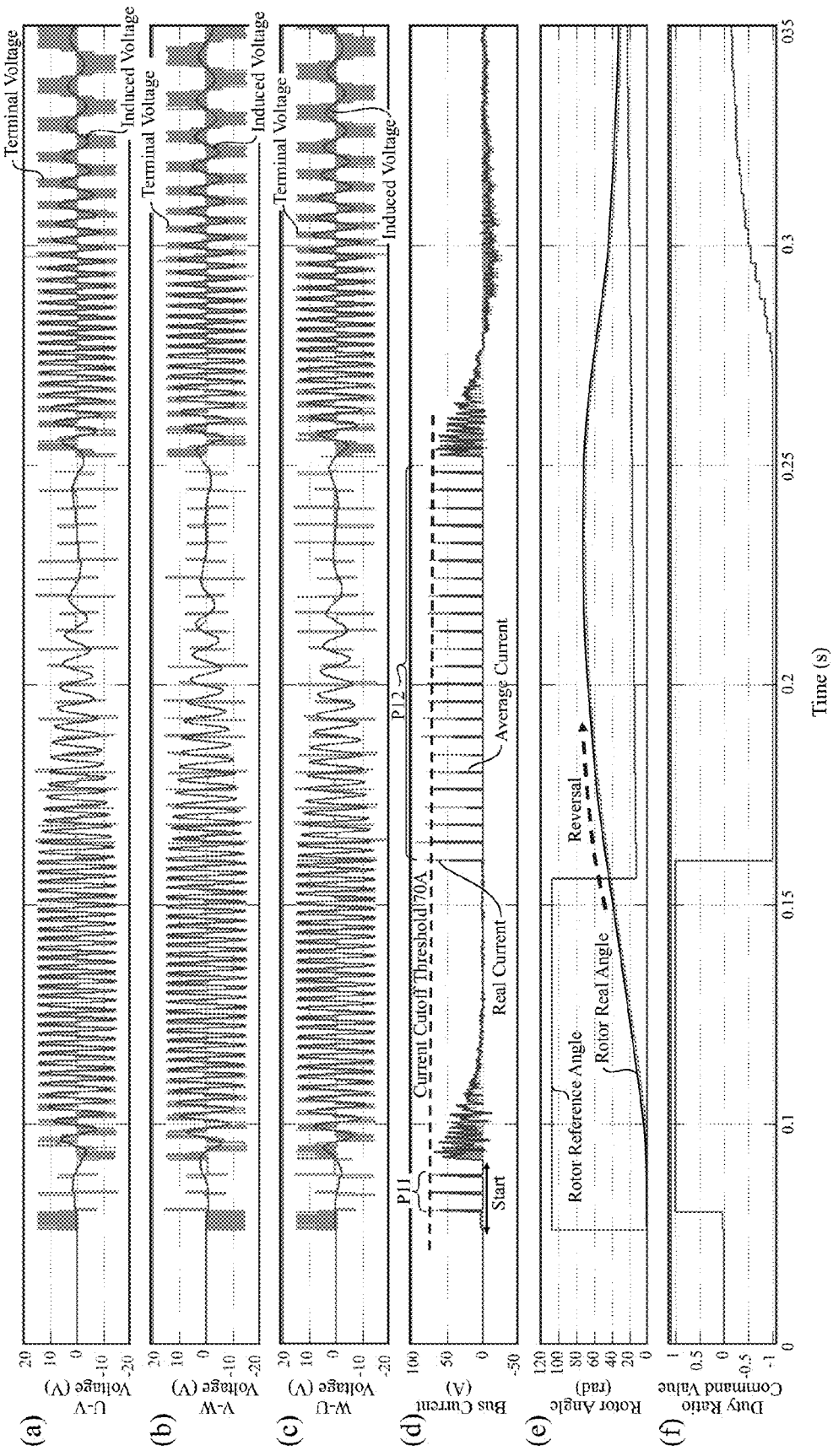
FIG. 7 is a graph showing operational waveforms when restarting PWM control without resetting after overcurrent detection, which is a reference example to help understanding of the motor drive of the embodiment 1.

Here, FIG. 7 shows an example that restarts the PWM control without resetting after overcurrent detection. As in FIG. 6, FIG. 7(a) shows the U-V terminal voltage and induced voltage of the motor 1; FIG. 7(b) shows the V-W terminal voltage and induced voltage; FIG. 7(c) shows the W-U terminal voltage and induced voltage; FIG. 7(d) shows the real current and average current through the bus; FIG. 7(e) shows the rotor reference angle and the rotor real angle; and FIG. 7(f) shows a waveform of the duty ratio command value.

After the overcurrent detector 12 detects the overcurrent at the current cutoff threshold 70 A and breaks the power supply to the motor 1, the example of FIG. 7 restarts the PWM control without resetting the duty ratio command value. Accordingly, at a start when the difference between the rotor reference angle and the rotor real angle is large, or at a reversal when the rotational direction of the rotor and the driving direction of the micro 13 are reverse, the overcurrent detection occurs successively (P11 and P12), and the power supply and break are repeated. In addition, during a reversal, if the overcurrent detector 12 detects the overcurrent in a state in which the motor 1 is rotating reversely and breaks the power supply, the motor 1 enters into an idle running state, thereby taking a long time period for the reversal. Furthermore, when the actuator 2 is forced with a spring or the like, the actuator 2 collides with a stopper without the reduction of the rotational speed of the motor 1.

Let us return to the description of FIG. 6 again.

Even if the duty ratio command value is reset as described in FIG. 7, if a large duty ratio command value occurs owing to the feedback control immediately after the reset, an overcurrent is detected again. To avoid this, although a method is conceivable such as "limiting the duty ratio command value variation speed" or "limiting the duty ratio command value for a fixed time period immediately after the reset", particular processing is required in either case.

Figure 8:
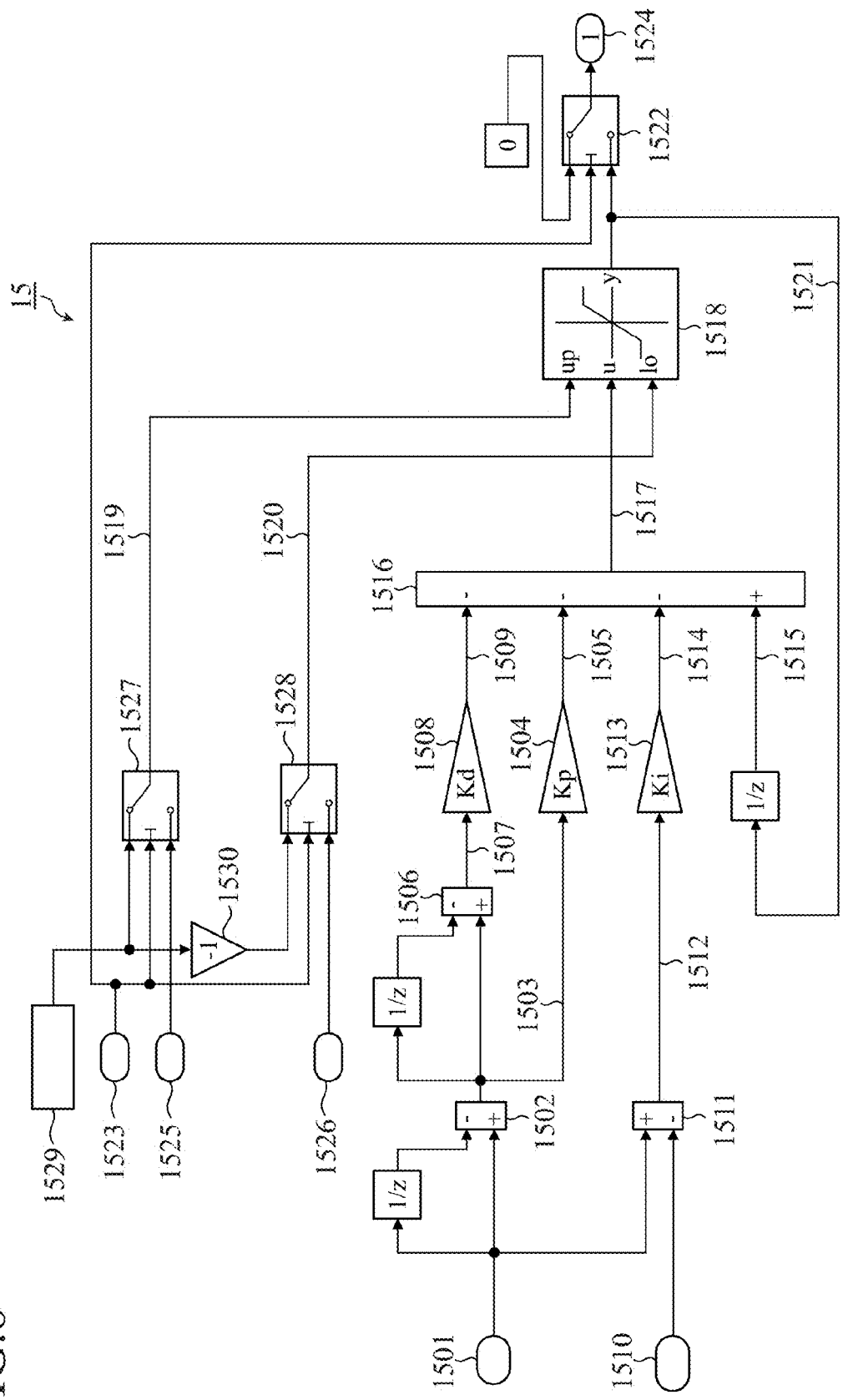
FIG. 8 is a diagram showing a configuration of a feedback controller of the motor drive of the embodiment 1.

In contrast with this, in the integral action of the feedback control executed within the feedback controller 15 as shown in FIG. 8, the present embodiment 1 varies the duty ratio command value after the overcurrent detection softly by varying the integral amount at the reset without adding any particular processing.

The feedback controller 15 shown in FIG. 8 performs feedback control of the stroke of the actuator 2 using the I-PD control, one of the PID control based on sampling.

First, the feedback control of the actuator stroke according to the I-PD control will be described. First, the stroke signal is input to an input port 1501 of the feedback controller 15. A subtractor 1502 calculates a stroke speed 1503 by calculating a variation from the stroke one sample before (1/z) to the present. A multiplier 1504 multiplies the stroke speed 1503 by a coefficient Kp of the proportional control to calculate a reduction 1505 per each sample through the proportional control. A subtractor 1506 calculates a stroke acceleration 1507 by calculating a variation from the stroke speed one sample before (1/z) to the present. A multiplier 1508 multiplies the stroke acceleration 1507 by a coefficient Kd of the derivative control to calculate a reduction 1509 per each sample through the derivative control.

A reference stroke of the actuator 2 is input to the input port 1510, and a subtractor 1511 calculates the difference 1512 between the reference stroke and the real stroke of the actuator 2. A multiplier 1513 multiplies the difference 1512 by a coefficient Ki of the integral control to calculate a reduction 1514 per each sample through the integral control.

Then, an adder-subtractor 1516 calculates a duty ratio command value 1517 before limiting by subtracting the reduction 1505 per each sample by the proportional control, the reduction 1509 per each sample by the derivative control, and the reduction 1514 per each sample by the integral control from the duty ratio command value 1515 one sampling before. The PWM control using the duty ratio command value 1517 enables the feedback control of the stroke of the actuator 2.

Next, a limiting method of the duty ratio command value 1517 will be described. A limiter 1518 restricts the magnitude of the duty ratio command value 1517 calculated by the adder-subtractor 1516 between an upper limit duty ratio 1519 and a lower limit duty ratio 1520, and supplies the limited duty ratio 1521 to a short-circuit braking switch 1522. A reset input port 1523 is a port for detecting the short-circuit braking instruction (signal with a value 1) the overcurrent detector 12 outputs when the overcurrent is detected. When the reset input port 1523 is placed at 1, the short-circuit braking switch 1522 places the duty ratio command value at 0 to cause the gate driver 14 to output the gate driving signal for making the short-circuit braking state. The output of the short-circuit braking switch 1522 becomes the final output duty ratio command value of the feedback controller 15, and is supplied from a final duty ratio output port 1524 to the gate driver 14.

A duty upper limit input port 1525 receives an upper limit side limit value of the duty ratio in the normal operation, and a duty lower limit input port 1526 receives a lower limit side limit value of the duty ratio in the normal operation. The upper limit side and lower limit side limit values are supplied to the low side of switches 1527 and 1528, respectively. The switches 1527 and 1528 are switched by the signal of the reset input port 1523, and when the value of the reset input port 1523 is 0, they output the low side input value, and when it is 1, they output the high side input value. When the reset input port 1523 is placed at 1, a reset duty ratio set point 1529 is output as the upper limit duty ratio 1519. At the same time, as the lower limit duty ratio 1520, −(reset duty ratio set point) passing from the reset duty ratio set point 1529 through a −1 multiplier 1530 is output. In this way, at the reset, the limit value of the duty ratio command value is restricted to a reset set point. The reset set point may be 0.

In this way, in the state of carrying out the normal feedback control, varying the reset duty ratio set point 1529 from 0 to 1 will result in the variation of the duty ratio command value as shown in FIG. 9. FIG. 9(*a*) shows the limited duty ratio 1521; and FIG. 9(*b*) show the reset duty ratio set point 1529. At the time T1 when the reset duty ratio set point 1529 is changed to 1, the duty ratio 1521 (that is, the duty ratio command value) is reset. In the section T2 thereafter, the duty ratio 1521 increases through the integral action. Since the coefficient Ki of the multiplier 1513 used in the ordinary feedback is small enough, the duty ratio 1521 does not vary so much during a single sampling. As a result, although the duty ratio command value of the feedback control is reset after the overcurrent detection, the present embodiment 1 can prevent the repeated overcurrent detection due to the sudden increase in the duty ratio command value from occurring.

As described above, according to the embodiment 1, the motor drive comprises: the bus current detector 11 that detects the bus current flowing through the bus; the overcurrent detector 12 that detects an overcurrent by comparing the bus current the bus current detector 11 detects with the current cutoff threshold; the feedback controller 15 that calculates the duty ratio command value in such a manner that it follows the rotor reference angle; and the gate driver 14 that supplies power to the motor 1 by controlling the duty ratio of the switching elements 5-10 in accordance with the duty ratio command value the feedback controller calculates, and that breaks, if the overcurrent detector 12 detects the overcurrent, the power supply by opening the switching elements 5-10, wherein the feedback controller 15 provides, if the overcurrent detector 12 detects the overcurrent, the gate driver 14 with the short-circuit braking instruction to short-circuit the motor 1 so as to apply the short-circuit brake after the gate driver 14 breaks the power supply to the motor 1, and restarts the PWM control from the short-circuit braking state and from a state in which the duty ratio command value is reset to zero or reset to a value that will prevent the overcurrent. Accordingly, when it restarts the PWM control after the overcurrent detection, it can control the bus current, thereby hindering the detection of the overcurrent. As a result, as for the motor 1 with a small resistance value, it can control the abnormal detection of the overcurrent in spite of the normal operation such as at the reversal. In addition, since it can reduce the power cutoff at the abnormal detection, it can suppress the idle running and improve the responsiveness.

Incidentally, in the foregoing description, the logic control shown in FIG. 2 uses the duty ratio command=0 the feedback controller 15 outputs as the short-circuit braking instruction as well. On the other hand, when the logic control shown in FIG. 2 is not used and when the gate driver 14 necessitates the duty ratio command=0 and the short-circuit braking instruction separately, a configuration can be used in which the feedback controller 15 supplies the gate driver 14 with the duty ratio command=0 and the short-circuit braking instruction separately, for example.

Embodiment 2

The motor drive of the embodiment 1 does not consider the rotation of the motor 1 at a PWM control restart. Even so, when restarting the PWM control from a stationary or low speed state, it can restart the PWM control without any trouble. However, when starting the PWM control during the rotation of the motor 1, an overcurrent is detected as designated by 93 of FIG. 6 because of the counter electromotive force, which brings about a power supply incapable state again.

Here, the magnitude of the bus current will be described when the short-circuit braking is terminated and the PWM control is restarted during the rotation of the motor 1.

Figure 10:
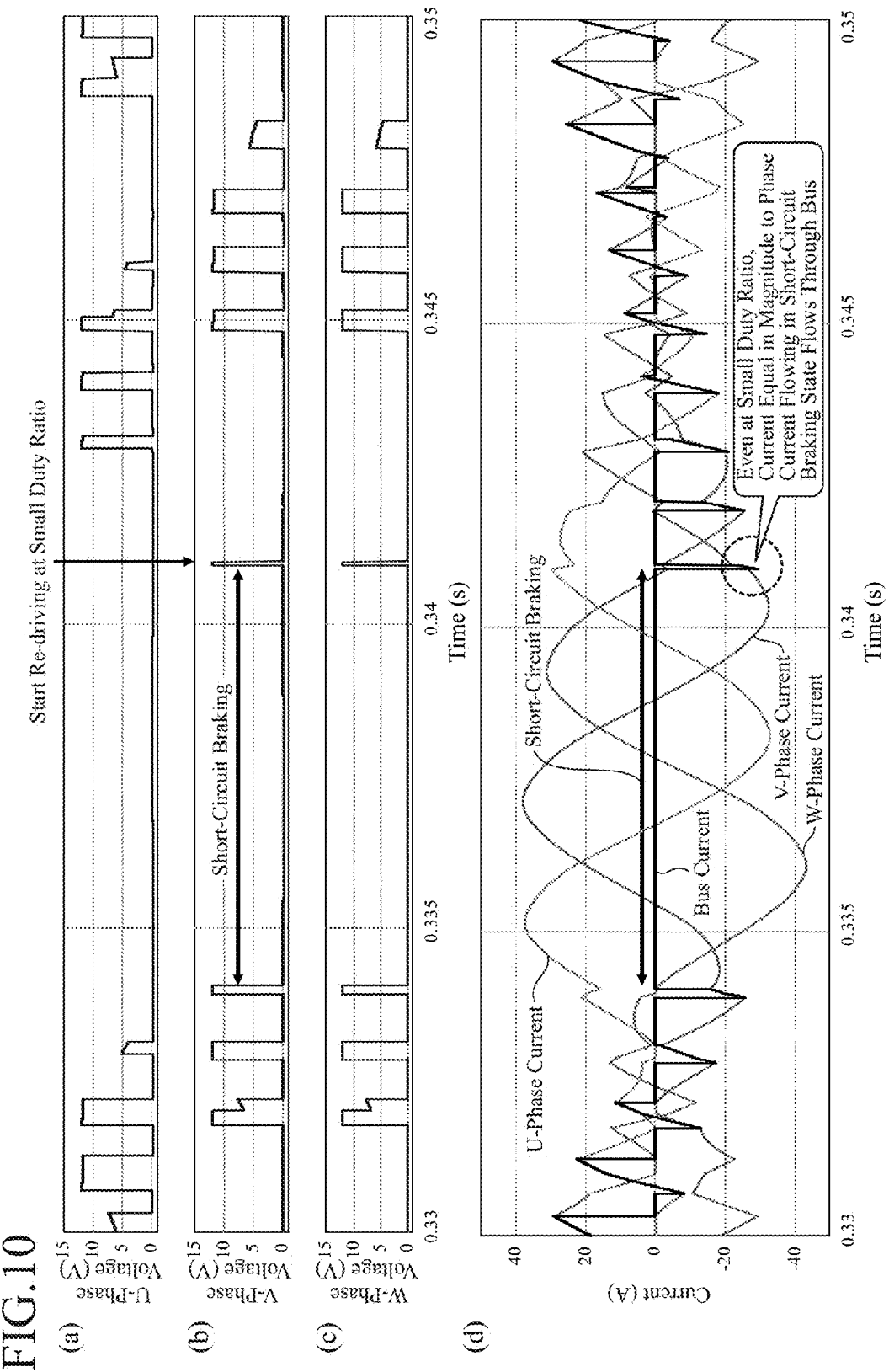
FIG. 10 is a reference example to help understanding of a motor drive of an embodiment 2 in accordance with the present invention, which is a graph showing operational waveforms at an end of short-circuit braking.

FIG. 10(*a*) shows a waveform of the U-phase terminal voltage of the motor 1; FIG. 10(*b*) shows a waveform of the V-phase terminal voltage; and FIG. 10(*c*) shows a waveform of the W-phase terminal voltage. In each graph, the vertical axis represents voltage and the horizontal axis represents time. FIG. 10(*d*) shows waveforms of the individual phase currents of the U-phase, V-phase and W-phase and a waveform of the bus current, in which the vertical axis represents current and the horizontal axis represents time. When restarting driving the motor 1 with a small duty ratio command value after the end of the short-circuit braking, the average value of the bus current at the power supply restart is proportional to the duty ratio. However, an instantaneous value flowing through the bus during the on period of the switching elements 5-10 is equal to the phase currents flowing through the motor 1 in the short-circuit braking state, and hence a large current flows. Since the breakdown of the circuit elements can occur instantaneously because of the overcurrent, the present embodiment 2 circumvents the instantaneous current.

Figure 11:
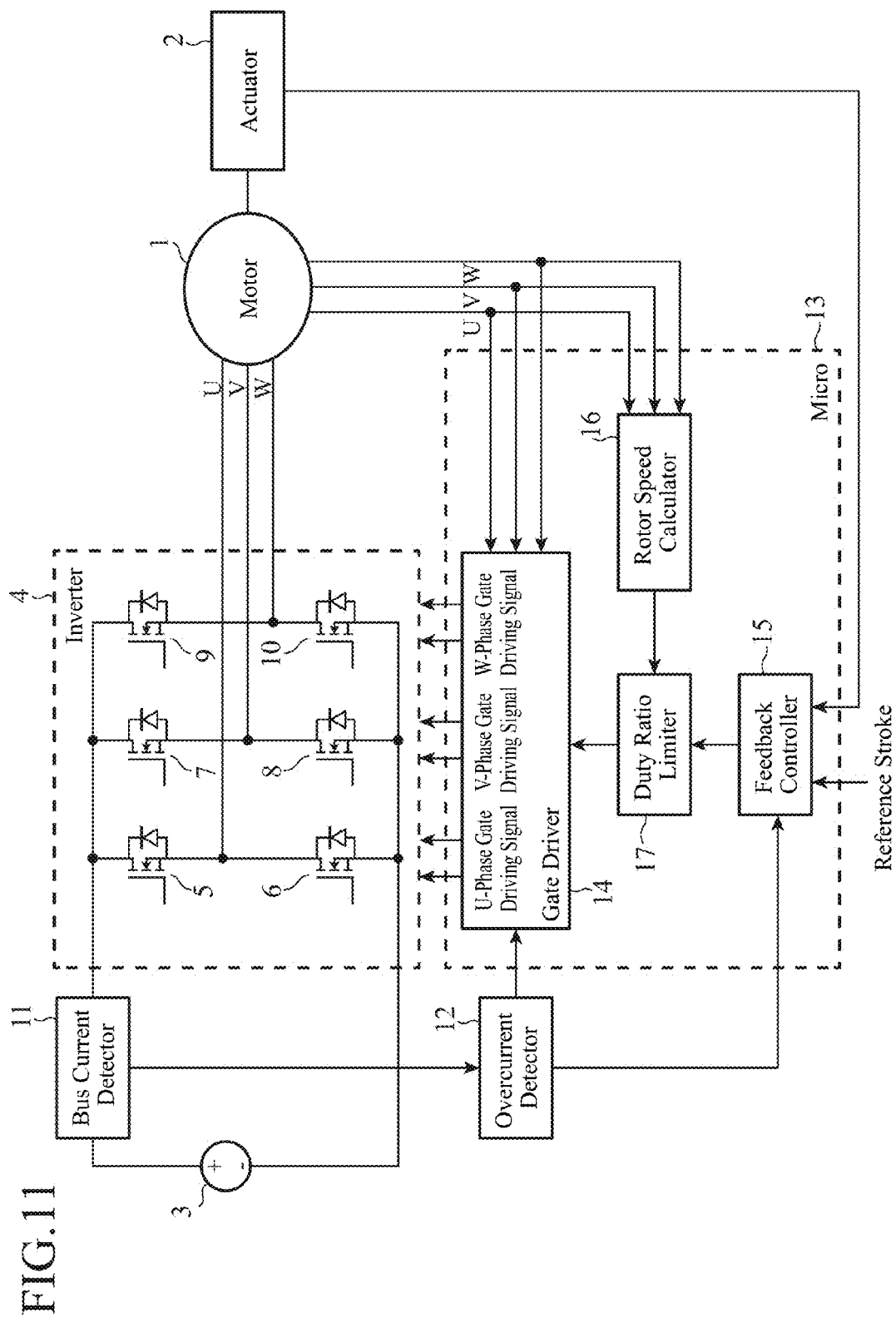
FIG. 11 is a circuit diagram showing a configuration of the motor drive of the embodiment 2.

FIG. 11 is a circuit diagram showing a configuration of the motor drive of the present embodiment 2, in which the same or like components to those of FIG. 1 are designated by the same reference symbols, and their description will be omitted.

In the motor drive shown in FIG. 11, the micro 13 comprises a rotor speed calculator 16 and a duty ratio limiter 17. The rotor speed calculator 16 calculates the rotational speed of the rotor using 3-phase rotor position detection signals output from the motor 1. As for the calculation method of the rotational speed of the rotor from the 3-phase rotor position detection signals, since it can use a publicly known technique, detailed description thereof will be omitted.

According to the rotational speed the rotor speed calculator 16 calculates, the duty ratio limiter 17 limits the duty ratio command value the feedback controller 15 obtains, and supplies it to the gate driver 14 as the limited duty ratio command value. More specifically, at a reversal in which the rotational direction of the rotor differs from the driving direction of the PWM control, and during the time period from the beginning of the reversal to the time at which the rotational speed reduces to not greater than the preset speed threshold, the duty ratio limiter 17 limits the duty ratio command value to 0 to bring about the short-circuit braking state.

Figure 12:
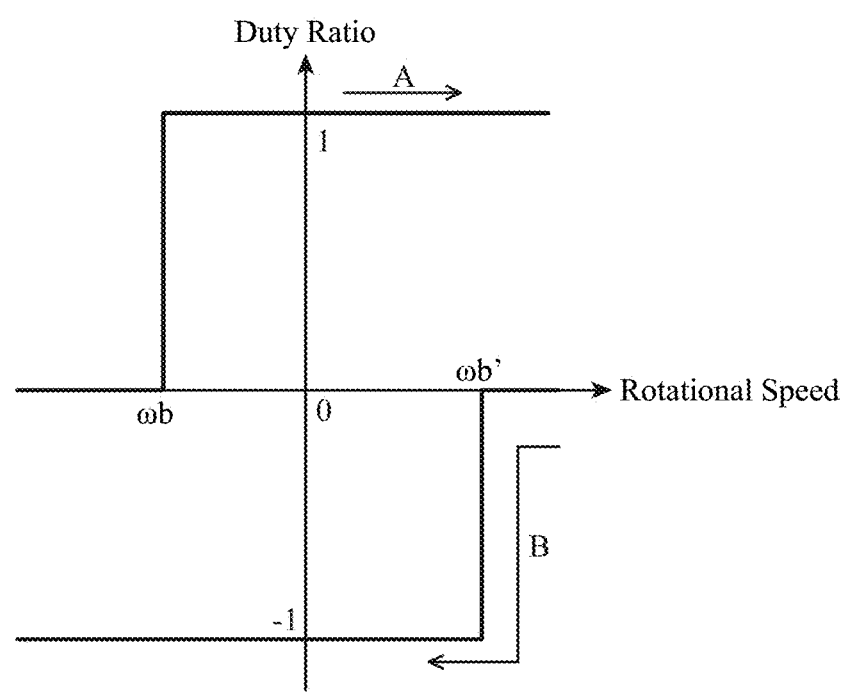
FIG. 12 is a graph illustrating speed thresholds and duty ratio upper-lower limits a duty ratio limiter of the motor drive of the embodiment 2 uses.

FIG. 12 is a graph illustrating upper-lower limits of the duty ratio limited by the speed threshold, in which the vertical axis represents limited duty ratio command value and the horizontal axis represents the rotational speed of the rotor. The absolute value of the rotational speed represents the speed of rotation, a positive value represents the forward direction and a negative value represents the reversal direction. The positive and negative of the duty ratio represent the driving direction, and the positive and negative of the rotational speed represents the rotational direction of the rotor. The speed threshold $\omega b$ is assumed to be the rotational speed at which the current flowing through the bus (that is, the power produced by the motor 1) is equal to the bus current tolerance when the rotational direction is forward and the limited duty ratio command value is 0. The speed threshold ωb' is assumed to be the rotational speed at which the current flowing through the bus is equal to the bus current tolerance when the rotational direction is reverse and the limited duty ratio command value is 0.

When the rotational speed is not less than the speed threshold ωb and not greater than ωb', the duty ratio limiter 17 supplies the gate driver 14 with the duty ratio command value the feedback controller 15 obtains as it is; and when the rotational speed is less than the speed threshold ωb or greater than ωb', it supplies the gate driver 14 with the duty ratio command value it has limited to 0. Incidentally, since the positive and negative of the duty ratio represent the driving direction, and the positive and negative of the rotational speed represent the rotational direction of the rotor, the foregoing relationship is equivalent to limiting the duty ratio command value to 0 until the absolute value of the rotational speed becomes equal to or less than the absolute values |ωb| and |ωb'| of the speed thresholds ωb and ωb'.

Because of the limit, at a start from the rotational speed 0, the limited duty ratio command value follows the upper limit duty ratio line as indicated by the arrow A, and at a reversal, it follows the lower limit duty ratio line as indicated by the arrow B. As a result, the present embodiment 2 can limit the duty ratio upper-lower limits within the bus current tolerance.

As a method of calculating the speed thresholds ωb and ωb', for example, it determines the maximum value of the current estimated by E/R which is given by E/R<bus current tolerance, obtains the rotational speed corresponding to the maximum value, and uses it as the speed threshold. Alternatively, it obtains the maximum value of ω from E/(R+jωL)<bus current tolerance, and uses it as the speed threshold. Here, E is the coil induced voltage of the motor 1, R is the coil resistance, j is the imaginary unit, u is the rotational speed, and L is the inductance.

Incidentally, as for the values of the coil induced voltage E and coil resistance R, they can be an actual measurement or a design value. In addition, as the bus current tolerance, a current value about a level that can prevent a breakdown of the circuit elements constituting the motor drive is used. As for the bus current tolerance and the current cutoff threshold, they may be the same value, or may take different values when they are restricted by the conditions of a power supply or conditions of a harness.

Next, the operation of the motor drive using the speed threshold shown in FIG. 12 will be described with reference to FIG. 13.

FIG. 13(a) shows waveforms of U-V terminal voltage and induced voltage of the motor 1; FIG. 13(b) shows waveforms of V-W terminal voltage and induced voltage; and FIG. 13(c) shows waveforms of W-U terminal voltage and induced voltage. In each graph, the vertical axis represents voltage and the horizontal axis represents time. FIG. 13(d) shows waveforms of the real current and average current through the bus the bus current detector 11 detects, in which the vertical axis represents current and the horizontal axis represents time. FIG. 13(e) shows waveforms of the rotor reference angle (corresponding to the reference stroke) and the rotor real angle (corresponding to the real stroke of the actuator 2) of the motor 1, in which the vertical axis represents the angle and the horizontal axis represents time. The rotor speed increases with an increase of the slope of a curve of the rotor real angle. FIG. 13(f) shows a waveform of the limited duty ratio command value the duty ratio limiter 17 of the micro 13 outputs, in which the vertical axis represents the duty ratio and the horizontal axis represents time. Incidentally, when the duty ratio>0, the drive control is assumed to be forward, and when the duty ratio<0, the drive control is assumed to be reverse.

Figure 13:
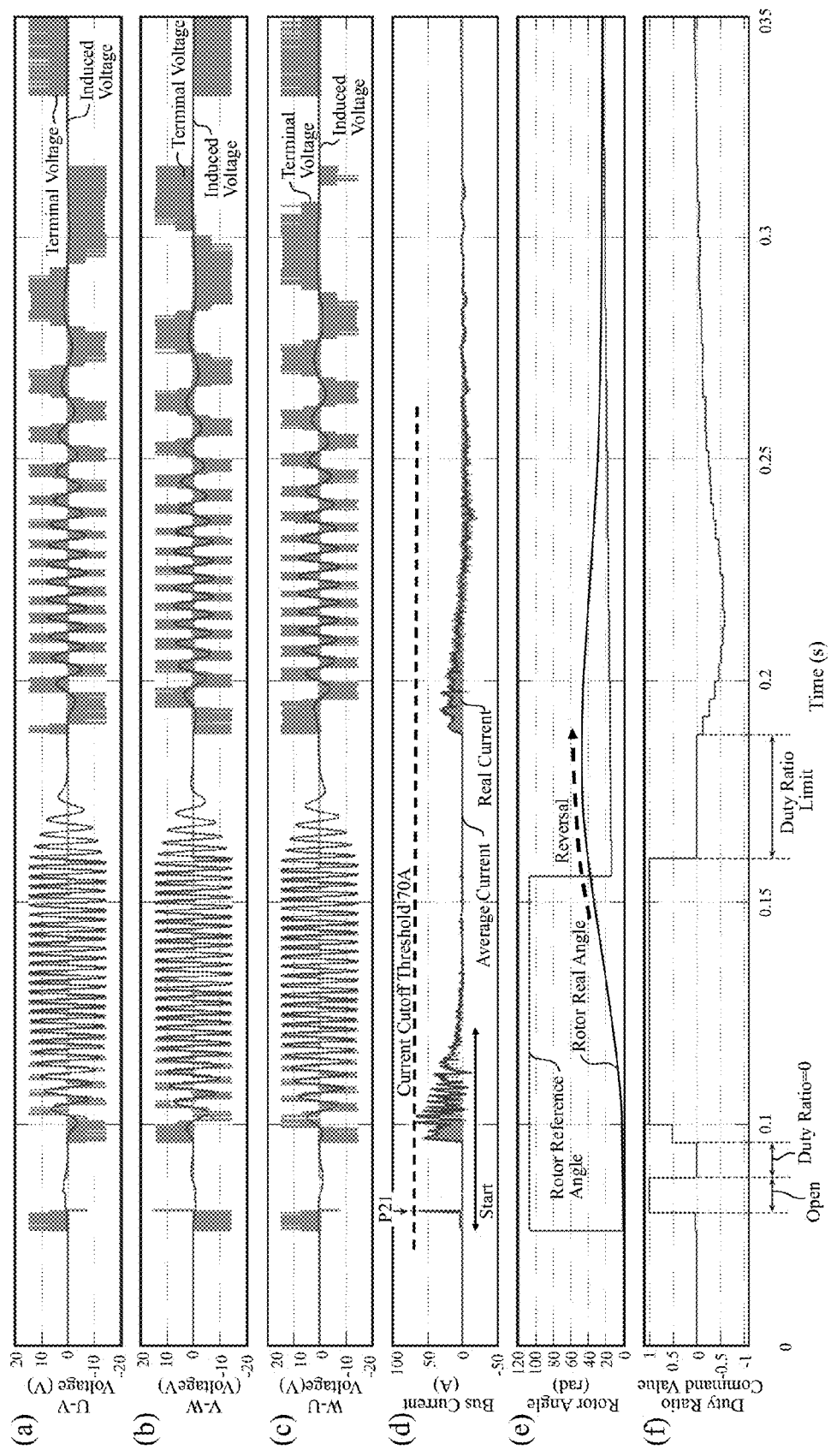
FIG. 13 is a graph showing operational waveforms of the motor drive of the embodiment 2.

As in the example of FIG. 6 of the foregoing embodiment 1, in the example of FIG. 13, the overcurrent detector 12 detects an overcurrent at the current cutoff threshold 70 A, and if a peak current through the bus the bus current detector 11 detects exceeds 70 A (P21), the overcurrent detector 12 supplies the open signal to the micro 13 for a prescribed time period to turn off all the switching elements 5-10, thereby breaking the power supply to the motor 1. In addition, the overcurrent detector 12 supplies the micro 13 with the duty ratio=0 command to reset the duty ratio command value to 0 and to apply the short-circuit braking, and restarts the PWM control from the duty ratio=0 state after terminating the short-circuit braking.

At the start, since the real rotational direction of the rotor agrees with the driving direction by the PWM control, the duty ratio limiter 17 does not limit the duty ratio command value. In contrast, when the feedback controller 15 of the micro 13 carries out reversal control of the rotor, the duty ratio takes a negative value and the rotational speed of the rotor takes a positive value at the beginning of the reversal, and thus the driving direction of the PWM control differs from the rotational direction of the rotor. Accordingly, the duty ratio limiter 17 compares the rotational speed of the rotor calculated by the rotor speed calculator 16 with the speed threshold ωb', and limits the duty ratio command value=−1 at the reversal, which is supplied from the feedback controller 15, to 0 until the time at which the rotational speed is reduced to the speed threshold ωb' or less, thereby limiting the current flowing through the bus within the bus current tolerance. When the rotational speed becomes equal to or less than the speed threshold ωb', the duty ratio command value the feedback controller 15 outputs is supplied to the gate driver 14 without the limit, and the normal feedback control is restarted. This enables preventing the instantaneous current as shown in FIG. 10 at the reversal, thereby being able to prevent the breakdown of the circuit elements due to the overcurrent. In addition, since it applies the short-circuit braking by setting the duty ratio command value at 0, it can reduce the idle running time period and quicken the reversal.

As described above, according to the embodiment 2, the motor drive comprises the rotor speed calculator 16 that calculates the rotational speed of the motor 1; and the duty ratio limiter 17 that limits the duty ratio command value the feedback controller 15 calculates to 0 until the absolute value of the rotational speed the rotor speed calculator 16 calculates becomes equal to or less than the speed threshold |ωb| and |ωb'|. Accordingly, it can suppress the instantaneous current after the application of the short-circuit brake by limiting the duty ratio command value to 0, thereby being able to further control the situation in which the overcurrent is abnormally detected even through the operation is normal.

In particular, when the driving direction of the PWM control is opposite to the rotational direction of the rotor, the present embodiment 2 limits the duty ratio command value to 0 and brings about the short-circuit braking state until the rotational speed the rotor speed calculator 16 calculates becomes equal to or less than the speed threshold, thereby being able to suppress the abnormal detection at the reversal and to improve the responsiveness.

Incidentally, in the foregoing description, the logic control shown in FIG. 2 uses the limited duty ratio command=0 the duty ratio limiter 17 supplies to the gate driver 14 as the short-circuit braking instruction as well. On the other hand, when the logic control shown in FIG. 2 is not employed and when the gate driver 14 necessitates the limited duty ratio command=0 and the short-circuit braking instruction separately, a configuration can be used in which the feedback controller 15 supplies the gate driver 14 with the short-circuit braking instruction as long as the duty ratio limiter 17 limits the duty ratio command value to 0, for example.

In addition, according to the embodiment 2, since the speed thresholds ωb and ωb' are set at the rotational speed at the time when the result of dividing the coil induced voltage E of the motor 1 by the coil resistance R becomes the bus current tolerance from the expression E/R<bus current tolerance, it can determine the speed threshold easily by using an actual measurement or a set point.

In addition, according to the embodiment 2, the speed thresholds ωb and ωb' are set at the rotational speed at the time when according to the expression E/(R+jωL)<bus current tolerance, the result of dividing the coil induced voltage E by the sum of the coil resistance R of the motor 1 and the product of the imaginary unit j, the rotational speed ω and the inductance value L becomes equal to the bus current tolerance. Accordingly, it can determine more accurate speed thresholds using an actual measurement or set point.

Embodiment 3

Since the motor drive of an embodiment 3 has the same configuration as the motor drive shown in FIG. 11 from the point of view of the drawing, it will be described with reference to FIG. 11.

Figure 14:
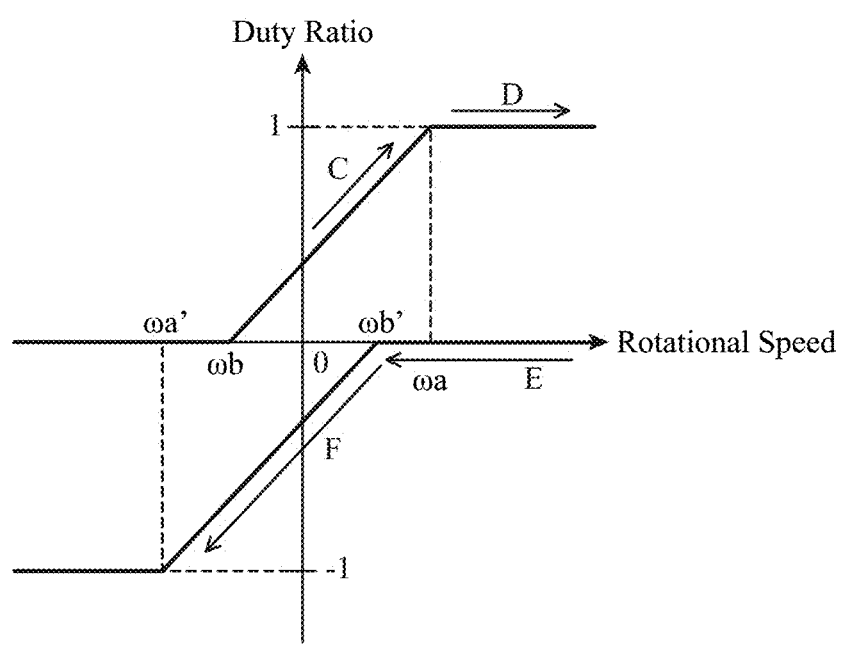
FIG. 14 is a graph illustrating speed thresholds and duty ratio upper-lower limits a duty ratio limiter of the motor drive of an embodiment 3 in accordance with the present invention uses.

FIG. 14 is a graph illustrating speed thresholds the duty ratio limiter 17 of the present embodiment 3 uses, in which the vertical axis represents duty ratio and the horizontal axis represents rotational speed. The positive and negative of the duty ratio represent driving directions, and the positive and negative of the rotational speed represent the rotational directions of the rotor.

The speed threshold ωa is assumed to be the rotational speed at which the current flowing through the bus equals the bus current tolerance when the rotational direction is forward and the limited duty ratio command value is 1. The speed threshold ωb is assumed to be the rotational speed at which the current flowing through each phase coil equals the bus current tolerance when the rotational direction is reverse and the limited duty ratio command value is 0. In addition, the speed threshold ωa' is assumed to be the rotational speed at which the current flowing through the bus equals the bus current tolerance when the rotational direction is reverse and the limited duty ratio command value is −1. The speed threshold ωb' is assumed to be the rotational speed at which the maximum value of the current flowing through each phase coil equals the bus current tolerance when the rotational direction is forward and the limited duty ratio command value is 0.

The upper limit duty ratio line is assumed to be a line which is 0 in the range of rotational speed<speed threshold ωb, which is 1 in the range of rotational speed>speed threshold ωa, and which connects across ωb and ωa. The lower limit duty ratio line is assumed to be a line which is 0 in the range of rotational speed>speed threshold ωb', which is −1 in the range of rotational speed<speed threshold ωa', and which connects across ωb' and ωa'.

The duty ratio limiter 17 retains the duty ratio upper-lower limits determined by the speed thresholds ωa and ωa' and ωb and ωb' as shown in FIG. 14 as a lookup table, for example. When the duty ratio command value input from the feedback controller 15 exceeds the duty ratio upper-lower limits corresponding to the rotational speed of the rotor input from the rotor speed calculator 16, the duty ratio limiter 17 limits the duty ratio command value to the duty ratio upper-lower limits and supplies it to the gate driver 14. As a result, at a start from the rotational speed 0, the limited duty ratio command value follows the upper limit duty ratio line as indicated by the arrows C and D, and at the reversal, it follows the lower limit duty ratio line as indicated by the arrows E and F, thereby being able to limit the duty ratio upper-lower limits within the bus current tolerance.

Next, referring to FIG. 15, the operation of the motor drive using the speed thresholds shown in FIG. 14 will be described.

Incidentally, although the duty ratio limiter 17 limits the duty ratio command value in accordance with rotational speed only when the rotational direction of the rotor differs from the driving direction in the foregoing embodiment 2, the present embodiment 3 will be described using an example which limits the duty ratio command value in accordance with only the rotational speed regardless of the relationships between the rotational direction of the rotor and the driving direction.

Figure 15:
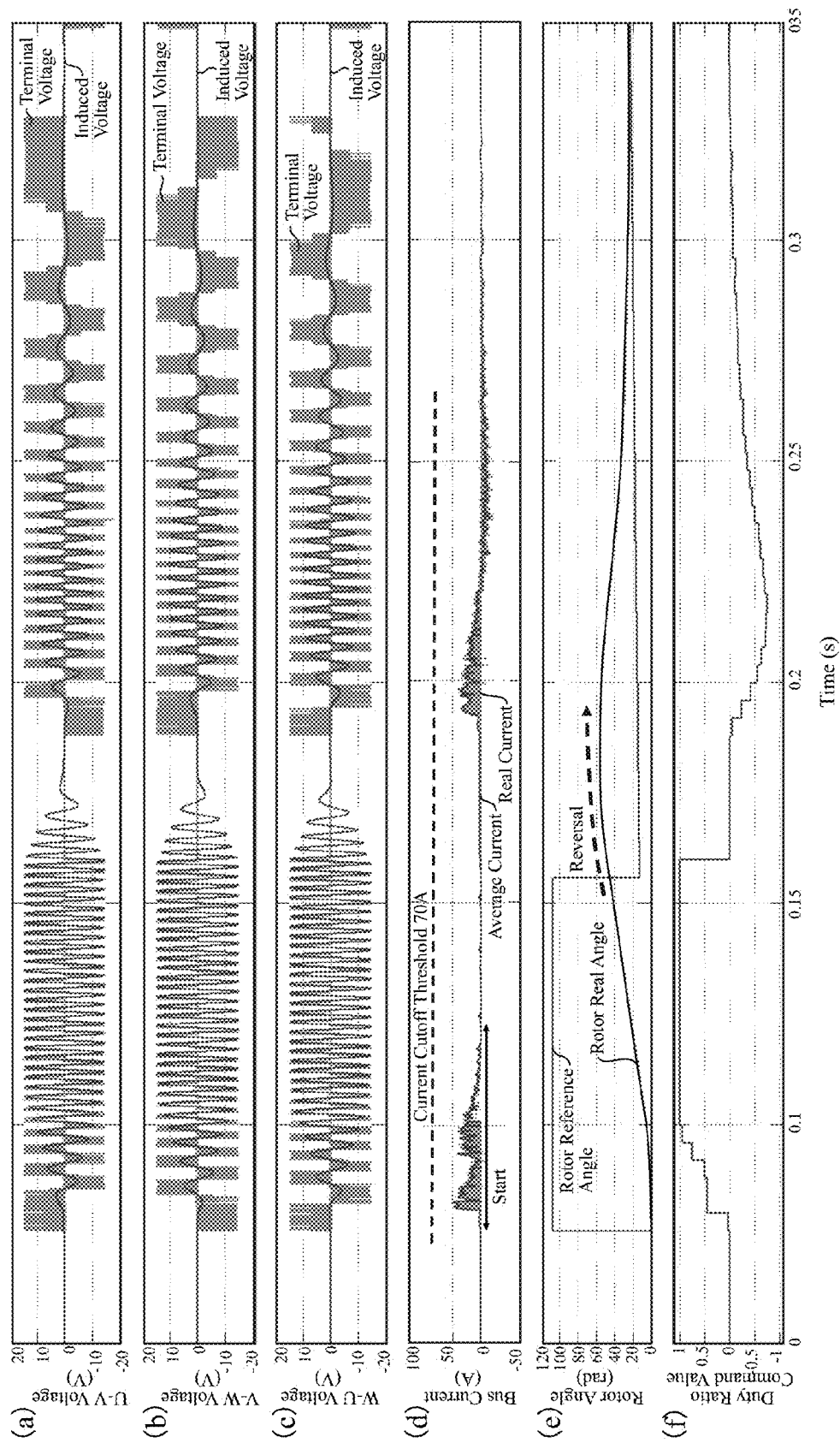
FIG. 15 is a graph showing operational waveforms of the motor drive of the embodiment 3.

FIG. 15(*a*) shows waveforms of U-V terminal voltage and induced voltage of the motor 1; FIG. 15(*b*) shows waveforms of V-W terminal voltage and induced voltage; and FIG. 15(*c*) shows waveforms of W-U terminal voltage and induced voltage. In each graph, the vertical axis represents voltage and the horizontal axis represents time. FIG. 15(*d*) shows waveforms of the real current and average current through the bus the bus current detector 11 detects, in which the vertical axis represents current and the horizontal axis represents time. FIG. 15(*e*) shows waveforms of the rotor reference angle (corresponding to the reference stroke) and the rotor real angle (corresponding to the real stroke of the actuator 2) of the motor 1, in which the vertical axis represents the angle and the horizontal axis represents time. The rotor speed increases with an increase of the slope of the curve of the rotor real angle. FIG. 15(*f*) shows a waveform of the limited duty ratio command value the duty ratio limiter 17 of the micro 13 outputs, in which the vertical axis represents the duty ratio and the horizontal axis represents time. Incidentally, when the duty ratio>0, the drive control is assumed to be forward, and when the duty ratio<0, the drive control is assumed to be reverse.

Since the difference between the rotor reference angle and the rotor real angle is large at the start, the feedback controller 15 outputs the duty ratio command value=1. However, according to the rotational speed of the rotor supplied from the rotor speed calculator 16, the duty ratio limiter 17 limits the duty ratio command value the feedback controller 15 obtains. Accordingly, at the start, as the rotational speed increases as shown in FIG. 15(*f*), the limited duty ratio command value also increases gradually along the upper limit duty ratio line (arrows C and D of FIG. 14) determined by the speed thresholds ωa and ωb. Thus, the current flowing through the bus is limited within the range of the bus current tolerance at the start, which enables preventing an overcurrent that goes beyond the current cutoff threshold 70 A set in the overcurrent detector 12.

On the other hand, at a reversal, the duty ratio limiter 17 limits the duty ratio command value along the lower limit duty ratio line (arrows E and F of FIG. 14) determined by the speed thresholds ωb' and ωa', the limited duty ratio command value is limited to 0 at a start of the reversal. Then, as the rotational speed varies, the limited duty ratio command value varies gradually to a negative value. Thus, the current flowing through the bus is also limited within the range of the bus current tolerance at the reversal, which enables preventing the overcurrent that will go beyond the current cutoff threshold 70 A set in the overcurrent detector 12. In addition, since the present embodiment 3 applies the short-circuit braking by placing the duty ratio command value at 0, it can reduce the idle running time period and quickens the reversal.

Incidentally, as for the speed thresholds ωa and ωa', and ωb and ωb', the present embodiment 3 can calculate them from an Expression E/R<bus current tolerance or E/(R+jωL) <bus current tolerance as the foregoing embodiment 2.

As described above, according to the embodiment 3, it configures the duty ratio limiter 17 in such a manner that it limits the duty ratio command value the feedback controller 15 calculates to 0 until the absolute value of the rotational speed the rotor speed calculator 16 calculates becomes not greater than the speed thresholds |ωb| and |ωb'|, and brings about the short-circuit braking state, and that when the absolute value of the rotational speed is not greater than the speed thresholds |ωb| and |ωb'|, it limits the duty ratio command value in accordance with the rotational speed. Accordingly, it can reduce the detection of the overcurrent at both the reversal and start.

Embodiment 4

Figure 16:
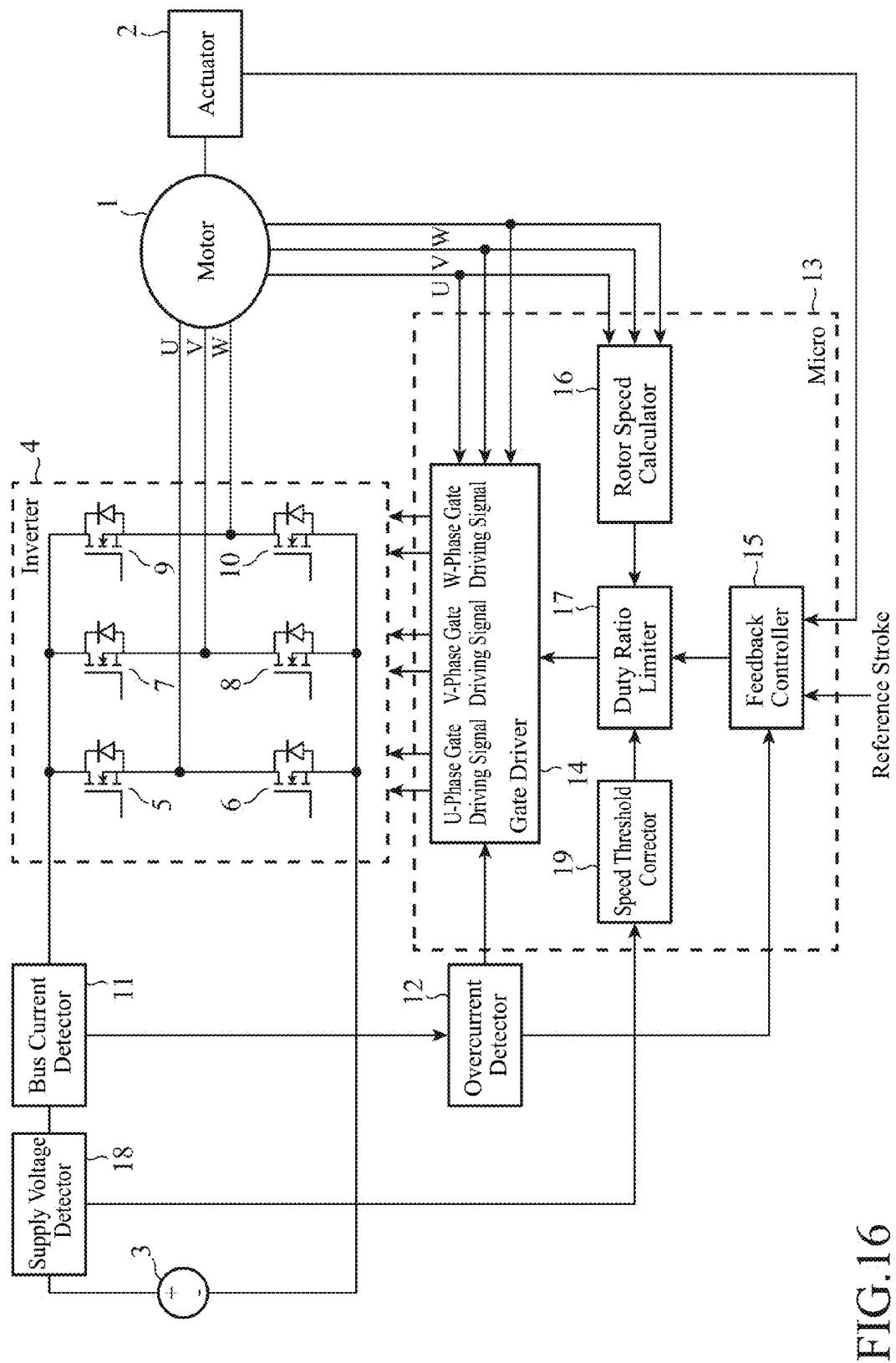
FIG. 16 is a circuit diagram showing a configuration of a motor drive of an embodiment 4 in accordance with the present invention.

FIG. 16 is a circuit diagram showing a configuration of a motor drive of the embodiment 4, in which the same or like components to those of FIG. 11 are designated by the same reference symbols, and their description will be omitted.

The motor drive shown in FIG. 16 comprises a supply voltage detector 18 that detects the voltage of the DC power supply 3; and a speed threshold corrector 19 that corrects the speed thresholds that limits the duty ratio command value in accordance with the supply voltage the supply voltage detector 18 detects.

Figure 17:
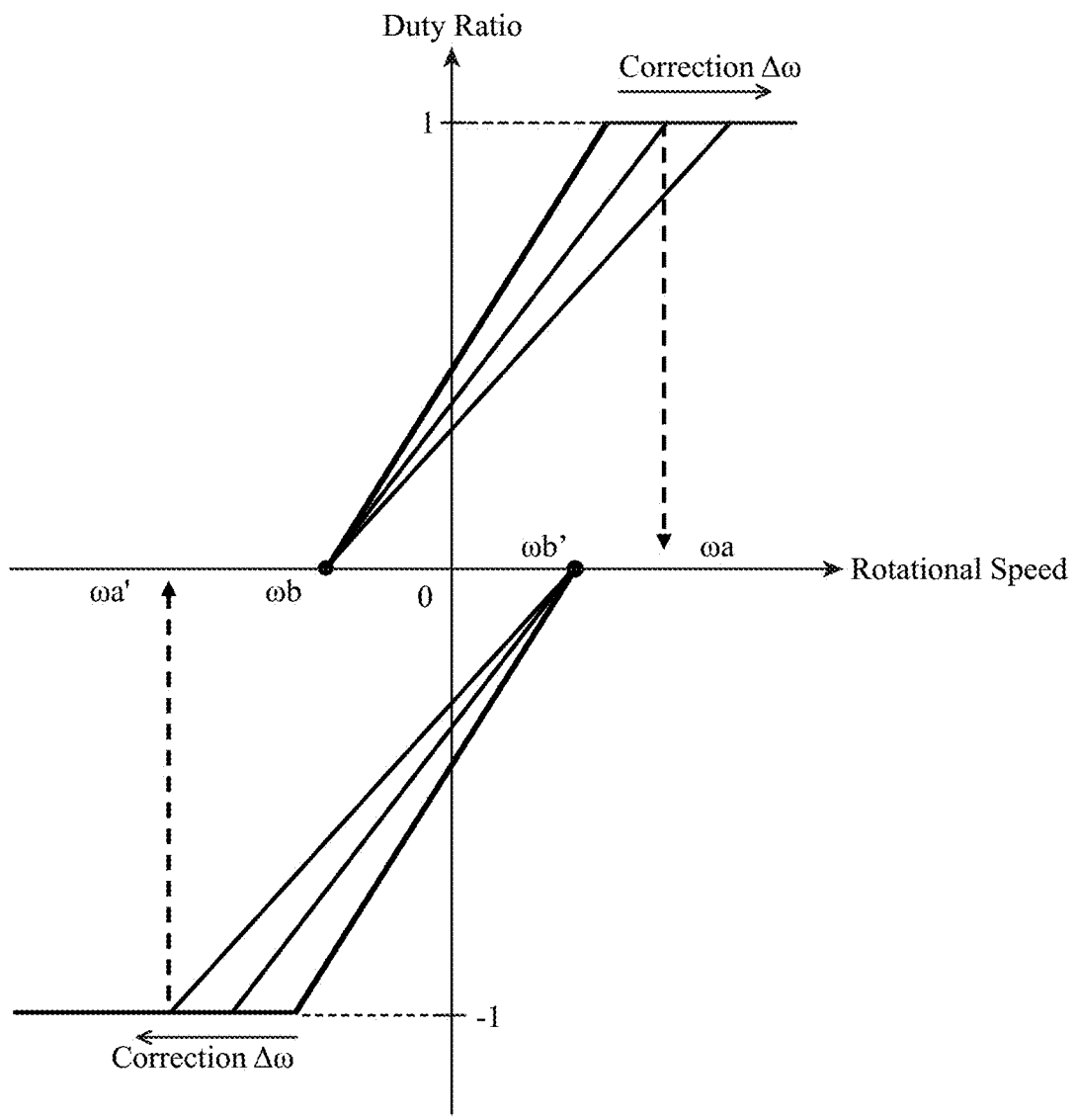
FIG. 17 is a graph illustrating speed thresholds and duty ratio upper-lower limits a duty ratio limiter of the motor drive of the embodiment 4 uses.

FIG. 17 is a diagram illustrating a correcting method of the speed thresholds according to the supply voltage, in which the vertical axis represents the duty ratio and the horizontal axis represents the rotational speed of the motor. Although the speed thresholds ωb and ωb' are fixed regardless of the supply voltage, the speed thresholds ωa and ωa' vary in accordance with the supply voltage.

According to the bus current tolerance I of the following Expression (1) and according to the speed threshold ω given by the following Expression (2), at which the limited duty ratio command value is 1 (that is, ω is ωa or ωa'), the speed threshold ω varies as the following Expression (3) when the supply voltage V varies to V+ΔV.

$$I = (V - \omega^* K)/R \quad (1)$$

$$\omega = (V - I^* R)/K \quad (2)$$

$$\omega + \Delta\omega = (V + \Delta V - I^* R)/K$$

$$\Delta\omega = \Delta V/K \quad (3)$$

Here, K is an induced voltage constant of the motor 1, and R is a coil resistance.

The speed threshold corrector 19 calculates the variable quantity ΔV of the supply voltage V fed from the supply voltage detector 18, corrects the speed thresholds ωa and ωa' of the duty ratio limiter 17 by the correction Δw, and updates to the duty ratio upper-lower limits corresponding to the supply voltage.

For example, when the duty ratio limiter 17 retains the lookup table of the duty ratio upper-lower limits for each correction Δω, the speed threshold corrector 19 selects the lookup table to be used in accordance with the variable quantity ΔV of the supply voltage V.

As described above, according to the embodiment 4, the motor drive is configured in such a manner that it comprises the supply voltage detector 18 that detects the voltage of the DC power supply 3; and the speed threshold corrector 19 that calculates the correction Δω of the speed thresholds ωa and ωa' in accordance with the supply voltage the supply voltage detector 18 detects, and that the duty ratio limiter 17 corrects the limit amount of the duty ratio command value in accordance with the supply voltage using the correction Δω the speed threshold corrector 19 calculates. Accordingly, even if the supply voltage fluctuates, it can carry out the PWM control of the switching elements 5-10 appropriately, thereby being able to control the overcurrent detection at a start and reversal.

Incidentally, although the foregoing description is made by way of example that uses a brushless motor as the motor 1, a motor with brushes can also be used.

In addition, although the foregoing description shows a configuration in which the feedback controller 15 calculates the duty ratio command value from the real stroke and the reference stroke of the actuator, a configuration is also possible in which it can calculate the duty ratio command value from the rotor angle obtained from the 3-phase rotor position detection signal of the motor 1 and the reference angle.

Besides the foregoing description, it is to be understood that a free combination of the individual embodiments, variations of any components of the individual embodiments or removal of any components of the individual embodiments is possible within the scope of the present invention.

INDUSTRIAL APPLICABILITY

As described above, a motor drive in accordance with the present invention restarts the normal feedback control from the state in which the duty ratio=0 and the short-circuit braking is being applied after the overcurrent detection of the bus, and restrains the situation in which the overcurrent detection circuit is actuated and breaks the power supply in spite of the normal motor operation. Accordingly, the motor drive is suitable for applications such as a motor drive that drives and controls a motor with a small resistance and high responsiveness.

DESCRIPTION OF REFERENCE SYMBOLS

1 motor; 2 actuator; 3 DC power supply; 4 inverter; 5-10 switching elements; 11 bus current detector; 12 overcurrent detector; 13 micro; 14 gate driver; 15 feedback controller; 16 rotor speed calculator; 17 duty ratio limiter; 18 supply voltage detector; 19 speed threshold corrector.

What is claimed is:

1. A motor drive that controls a motor by carrying out PWM control of switching elements in accordance with a reference value, the motor drive comprises:
    an overcurrent detector that detects an overcurrent by comparing a bus current flowing through a bus with a current cutoff threshold;
    a feedback controller that calculates a duty ratio command value in accordance with the reference value; and
    a gate driver that supplies power to the motor by controlling duty ratios of the switching elements in accordance with the duty ratio command value the feedback controller calculates, and that breaks, if the overcurrent detector detects the overcurrent, the power supply by opening the switching elements, a rotational speed calculator that calculates rotational speed of the motor; and a duty ratio limiter that limits the duty ratio command value calculated by the feedback controller to zero until the rotational seed calculated by the rotational speed calculator becomes equal to or less than a speed threshold, wherein the feedback controller provides, if the overcurrent detector detects the overcurrent, the gate driver with a short-circuit braking instruction for short-circuiting the motor to apply a short-circuit brake after the gate driver breaks the power to the motor, continues to output the short-circuit braking instruction as long as the duty ratio limiter limits the duty ratio command value to zero, and restarts the PWM control from a short-circuit braking state and from a state in which the duty ratio command value calculated by the feedback controller is reset to zero or to a value that will prevent the overcurrent.

2. The motor drive according to claim 1, wherein the duty ratio limiter limits, when a driving direction of the PWM control differs from a rotational direction of the motor, the duty ratio command value calculated by the feedback controller to zero until the rotational speed the rotational speed calculator calculates becomes equal to or less than the speed threshold; and the feedback controller outputs a short-circuit braking instruction as long as the duty ratio limiter is limiting the duty ratio command value at zero.

3. The motor drive according to claim 1, wherein the speed threshold is set at a rotational speed at which a result of dividing coil induced voltage of the motor by a coil resistance becomes equal to a tolerance of the bus current.

4. The motor drive according to claim 1, wherein the duty ratio limiter limits, when the rotational speed the rotational speed calculator calculates is equal to or less than the speed threshold, the duty ratio command value the feedback controller calculates in accordance with the rotational speed.

5. The motor drive according to claim 1, wherein the speed threshold is set at a rotational speed at which a result of dividing coil induced voltage by a result of adding a product of the rotational speed, imaginary unit and an inductance value to a coil resistance of the motor becomes equal to a tolerance of the bus current.

6. The motor drive according to claim 4, wherein the duty ratio limiter corrects a limit amount of the duty ratio command value in accordance with the supply voltage.

* * * * *